US009253833B2

(12) United States Patent
Zanbaghi et al.

(10) Patent No.: US 9,253,833 B2
(45) Date of Patent: Feb. 2, 2016

(54) SINGLE PIN CONTROL OF BIPOLAR JUNCTION TRANSISTOR (BJT)-BASED POWER STAGE

(71) Applicant: Cirrus Logic, Inc., Austin, TX (US)

(72) Inventors: Ramin Zanbaghi, Austin, TX (US); John L. Melanson, Austin, TX (US); Jieyeon Choi, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 14/280,474

(22) Filed: May 16, 2014

(65) Prior Publication Data

US 2014/0339995 A1 Nov. 20, 2014

Related U.S. Application Data

(60) Provisional application No. 61/824,725, filed on May 17, 2013.

(51) Int. Cl.
*H05B 37/02* (2006.01)
*H05B 33/08* (2006.01)
*H02M 3/158* (2006.01)
*H02M 1/00* (2007.01)

(52) U.S. Cl.
CPC ........... *H05B 33/0815* (2013.01); *H02M 3/158* (2013.01); *H02M 2001/0009* (2013.01)

(58) Field of Classification Search
CPC ........... H05B 33/0815; H05B 33/0818; H05B 37/029; H05B 37/02; H05B 33/0803
USPC .......................... 315/224, 291, 294, 191, 307
See application file for complete search history.

(56) References Cited

U.S. PATENT DOCUMENTS

| 3,660,751 A | 5/1972 | Bullinga |
| 3,790,878 A | 2/1974 | Brokaw |
| 4,322,785 A | 3/1982 | Walker |

(Continued)

FOREIGN PATENT DOCUMENTS

| EP | 0536535 A1 | 4/1993 |
| EP | 0636889 A1 | 2/1995 |

(Continued)

OTHER PUBLICATIONS

International Search Report and Written Opinion mailed Sep. 18, 2014, during examination of PCT/US2014/038490.

(Continued)

*Primary Examiner* — Douglas W Owens
*Assistant Examiner* — Syed M Kaiser
(74) *Attorney, Agent, or Firm* — Norton Rose Fulbright US LLP

(57) ABSTRACT

A power stage for light emitting diode (LED)-based light bulbs may include a bipolar junction transistor (BJT). The base of BJT switch may be biased externally and the operation of the BJT may be through a single pin to the emitter of the BJT. A controller integrated circuit (IC) may control the power stage through the main BJT's emitter pin in an emitter-controlled BJT-based power stage. The emitter-controlled BJT-based power stage may replace the conventional buck-boost power stage topology. For example, the controller may activate and deactivate a switch coupling the BJT's emitter to ground. A power supply for the controller IC may be charged from a reverse recovery of charge from the BJT, and the reverse recovery controlled by the controller IC.

27 Claims, 11 Drawing Sheets

(56) References Cited

U.S. PATENT DOCUMENTS

| | | |
|---|---|---|
| 4,339,671 A | 7/1982 | Park et al. |
| 4,342,956 A | 8/1982 | Archer |
| 4,399,500 A | 8/1983 | Clarke et al. |
| 4,410,810 A | 10/1983 | Christen |
| 4,493,017 A | 1/1985 | Kammiller et al. |
| 4,585,986 A | 4/1986 | Dyer |
| 4,629,971 A | 12/1986 | Kirk |
| 4,675,547 A | 6/1987 | Eichenwald |
| 4,677,366 A | 6/1987 | Wilkinson et al. |
| 4,683,529 A | 7/1987 | Bucher, II |
| 4,737,658 A | 4/1988 | Kronmuller et al. |
| 4,739,462 A | 4/1988 | Farnsworth et al. |
| 4,937,728 A | 6/1990 | Leonardi |
| 4,940,929 A | 7/1990 | Williams |
| 4,970,635 A | 11/1990 | Shekhawat et al. |
| 4,977,366 A | 12/1990 | Powell |
| 5,001,620 A | 3/1991 | Smith |
| 5,003,454 A | 3/1991 | Bruning |
| 5,055,746 A | 10/1991 | Hu et al. |
| 5,109,185 A | 4/1992 | Ball |
| 5,173,643 A | 12/1992 | Sullivan et al. |
| 5,264,780 A | 11/1993 | Bruer et al. |
| 5,278,490 A | 1/1994 | Smedley |
| 5,383,109 A | 1/1995 | Maksimovic et al. |
| 5,424,665 A | 6/1995 | Sueri et al. |
| 5,424,932 A | 6/1995 | Inou et al. |
| 5,430,635 A | 7/1995 | Liu |
| 5,479,333 A | 12/1995 | McCambridge et al. |
| 5,481,178 A | 1/1996 | Wilcox et al. |
| 5,486,781 A | 1/1996 | Im |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,783,909 A | 7/1998 | Hochstein |
| 5,798,635 A | 8/1998 | Hwang et al. |
| 5,808,453 A | 9/1998 | Lee et al. |
| 5,874,725 A | 2/1999 | Yamaguchi |
| 5,960,207 A | 9/1999 | Brown |
| 5,994,885 A | 11/1999 | Wilcox et al. |
| 6,043,633 A | 3/2000 | Lev et al. |
| 6,084,450 A | 7/2000 | Smith et al. |
| 6,091,233 A | 7/2000 | Hwang et al. |
| 6,160,724 A | 12/2000 | Hemena et al. |
| 6,229,292 B1 | 5/2001 | Redl et al. |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,356,040 B1 | 3/2002 | Preis et al. |
| 6,445,600 B2 | 9/2002 | Ben-Yaakov |
| 6,469,484 B2 | 10/2002 | L'Hermite et al. |
| 6,510,995 B2 | 1/2003 | Muthu et al. |
| 6,531,854 B2 | 3/2003 | Hwang |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,657,417 B1 | 12/2003 | Hwang |
| 6,661,182 B2 | 12/2003 | Sridharan |
| 6,696,803 B2 | 2/2004 | Tao et al. |
| 6,724,174 B1 | 4/2004 | Esteves et al. |
| 6,758,199 B2 | 7/2004 | Masters et al. |
| 6,768,655 B1 | 7/2004 | Yang et al. |
| 6,781,351 B2 | 8/2004 | Mednik et al. |
| 6,839,247 B1 | 1/2005 | Yang et al. |
| 6,882,552 B2 | 4/2005 | Telefus et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,975,523 B2 | 12/2005 | Kim et al. |
| 6,980,446 B2 | 12/2005 | Simada et al. |
| 7,042,161 B1 | 5/2006 | Konopka |
| 7,072,191 B2 | 7/2006 | Nakao et al. |
| 7,099,163 B1 | 8/2006 | Ying |
| 7,161,816 B2 | 1/2007 | Shteynberg et al. |
| 7,221,130 B2 | 5/2007 | Ribeiro et al. |
| 7,224,206 B2 | 5/2007 | Pappalardo et al. |
| 7,233,135 B2 | 6/2007 | Noma et al. |
| 7,266,001 B1 | 9/2007 | Notohamiprodjo et al. |
| 7,292,013 B1 | 11/2007 | Chen et al. |
| 7,295,452 B1 | 11/2007 | Liu |
| 7,411,379 B2 | 8/2008 | Chu et al. |
| 7,414,371 B1 | 8/2008 | Choi et al. |
| 7,439,810 B2 | 10/2008 | Manicone et al. |
| 7,449,841 B2 | 11/2008 | Ball |
| 7,554,473 B2 | 6/2009 | Melanson |
| 7,567,091 B2 | 7/2009 | Farnworth et al. |
| 7,606,532 B2 | 10/2009 | Wuidart |
| 7,667,986 B2 | 2/2010 | Artusi et al. |
| 7,684,223 B2 | 3/2010 | Wei |
| 7,719,246 B2 | 5/2010 | Melanson |
| 7,719,248 B1 | 5/2010 | Melanson |
| 7,746,043 B2 | 6/2010 | Melanson |
| 7,804,480 B2 | 9/2010 | Jeon et al. |
| 7,834,553 B2 | 11/2010 | Hunt et al. |
| 7,859,488 B2 | 12/2010 | Kimura |
| 7,872,883 B1 | 1/2011 | Elbanhawy |
| 7,894,216 B2 | 2/2011 | Melanson |
| 8,008,898 B2 | 8/2011 | Melanson et al. |
| 8,169,806 B2 | 5/2012 | Sims et al. |
| 8,193,717 B2 | 6/2012 | Leiderman |
| 8,222,772 B1 | 7/2012 | Vinciarelli |
| 8,242,764 B2 | 8/2012 | Shimizu et al. |
| 8,248,145 B2 | 8/2012 | Melanson |
| 8,369,109 B2 | 2/2013 | Niedermeier et al. |
| 8,441,220 B2 | 5/2013 | Imura |
| 8,536,799 B1 | 9/2013 | Grisamore et al. |
| 8,610,364 B2 | 12/2013 | Melanson et al. |
| 2002/0082056 A1 | 6/2002 | Mandai et al. |
| 2003/0090252 A1 | 5/2003 | Hazucha |
| 2003/0111969 A1 | 6/2003 | Konishi et al. |
| 2003/0160576 A1 | 8/2003 | Suzuki |
| 2003/0174520 A1 | 9/2003 | Bimbaud |
| 2003/0214821 A1 | 11/2003 | Giannopoulos et al. |
| 2003/0223255 A1 | 12/2003 | Ben-Yaakov et al. |
| 2004/0046683 A1 | 3/2004 | Mitamura et al. |
| 2004/0196672 A1 | 10/2004 | Amei |
| 2005/0057237 A1 | 3/2005 | Clavel |
| 2005/0207190 A1 | 9/2005 | Gritter |
| 2005/0231183 A1 | 10/2005 | Li et al. |
| 2005/0270813 A1 | 12/2005 | Zhang et al. |
| 2005/0275354 A1 | 12/2005 | Hausman et al. |
| 2006/0013026 A1 | 1/2006 | Frank et al. |
| 2006/0022648 A1 | 2/2006 | Ben-Yaakov et al. |
| 2006/0214603 A1 | 9/2006 | Oh et al. |
| 2007/0103949 A1 | 5/2007 | Tsuruya |
| 2007/0182347 A1 | 8/2007 | Shteynberg et al. |
| 2008/0018261 A1 | 1/2008 | Kastner |
| 2008/0018267 A1* | 1/2008 | Arakawa et al. ............... 315/301 |
| 2008/0043504 A1 | 2/2008 | Ye et al. |
| 2008/0062584 A1 | 3/2008 | Freitag et al. |
| 2008/0062586 A1 | 3/2008 | Apfel |
| 2008/0117656 A1 | 5/2008 | Clarkin |
| 2008/0130336 A1 | 6/2008 | Taguchi |
| 2008/0175029 A1 | 7/2008 | Jung et al. |
| 2008/0259655 A1 | 10/2008 | Wei et al. |
| 2008/0278132 A1 | 11/2008 | Kesterson et al. |
| 2008/0310194 A1 | 12/2008 | Huang et al. |
| 2009/0040796 A1 | 2/2009 | Lalithambika et al. |
| 2009/0059632 A1 | 3/2009 | Li et al. |
| 2009/0067204 A1 | 3/2009 | Ye et al. |
| 2009/0108677 A1 | 4/2009 | Walter et al. |
| 2009/0184665 A1 | 7/2009 | Ferro |
| 2009/0295300 A1 | 12/2009 | King |
| 2010/0128501 A1 | 5/2010 | Huang et al. |
| 2010/0202165 A1 | 8/2010 | Zheng et al. |
| 2010/0238689 A1 | 9/2010 | Fei et al. |
| 2010/0244793 A1 | 9/2010 | Caldwell |
| 2011/0110132 A1 | 5/2011 | Rausch et al. |

(56) References Cited

U.S. PATENT DOCUMENTS

| | | | |
|---|---|---|---|
| 2011/0199793 A1 | 8/2011 | Kuang et al. | |
| 2011/0276938 A1 | 11/2011 | Perry et al. | |
| 2011/0291583 A1 | 12/2011 | Shen | |
| 2011/0298442 A1 | 12/2011 | Waltisperger et al. | |
| 2011/0309760 A1 | 12/2011 | Beland et al. | |
| 2012/0043899 A1* | 2/2012 | Veskovic | 315/200 R |
| 2012/0043900 A1* | 2/2012 | Chitta et al. | 315/201 |
| 2012/0062131 A1 | 3/2012 | Choi et al. | |
| 2012/0146540 A1 | 6/2012 | Khayat et al. | |
| 2012/0182003 A1 | 7/2012 | Flaibani et al. | |
| 2012/0187997 A1 | 7/2012 | Liao et al. | |
| 2012/0248998 A1 | 10/2012 | Yoshinaga | |
| 2012/0286843 A1 | 11/2012 | Kurokawa | |
| 2012/0320640 A1 | 12/2012 | Baurle et al. | |
| 2013/0088902 A1 | 4/2013 | Dunipace | |
| 2013/0107595 A1 | 5/2013 | Gautier et al. | |
| 2013/0127353 A1* | 5/2013 | Athalye et al. | 315/193 |
| 2013/0181635 A1 | 7/2013 | Ling | |
| 2013/0293135 A1* | 11/2013 | Hu et al. | 315/224 |
| 2014/0218978 A1 | 8/2014 | Heuken et al. | |
| 2014/0265880 A1* | 9/2014 | Taipale et al. | 315/158 |
| 2015/0028768 A1* | 1/2015 | Melanson et al. | 315/294 |

FOREIGN PATENT DOCUMENTS

| | | |
|---|---|---|
| EP | 1213823 A2 | 6/2002 |
| EP | 1289107 A2 | 3/2003 |
| EP | 1962263 A2 | 8/2008 |
| EP | 2232949 A2 | 9/2010 |
| EP | 2257124 A1 | 12/2010 |
| JP | 2008053181 A | 3/2008 |
| WO | 01/84697 A2 | 11/2001 |
| WO | 2004051834 A1 | 6/2004 |
| WO | 2006013557 A2 | 2/2006 |
| WO | 2006/022107 A1 | 3/2006 |
| WO | 2007016373 A2 | 2/2007 |
| WO | 2008004008 A2 | 1/2008 |
| WO | 2008152838 A1 | 12/2008 |
| WO | 2010011971 A1 | 1/2010 |
| WO | 2010065598 A2 | 6/2010 |
| WO | 2011008635 A1 | 1/2011 |

OTHER PUBLICATIONS

International Search Report and Written Opinion mailed Sep. 16, 2014, during examination of PCT/US2014/038507.
Severns, A New Improved and Simplified Proportional Base Drive Circuit, Proceedings of PowerCon 6, May 1979.
Ivanovic, Zelimir, "A low consumption proportional base drive circuit design for switching transistors", Proceedings of the Fifth International PCI '82 Conference: Sep. 28-30, 1982, Geneva, Switzerland.
Bell, David, "Designing optimal base drive for high voltage switching transistors", Proceeding of PowerCon7, 1980.
Marcelo Godoy Simões, "Power Bipolar Transistors", Chapter 5, Academic Press 2001, pp. 63-74.
Varga, L.D. and Losic, N.A., "Design of a high-performance floating power BJT driver with proportional base drive," Industry Applications Society Annual Meeting, 1989., Conference Record of the Oct. 1-5, 1989, IEEE, vol. I, pp. I186, 1189.
Skanadore, W.R., "Toward an understanding and optimal utilization of third-generation bipolar switching transistors", 1982 IEEE.
IC datasheet STR-S6707 through STR-S6709 by Sanken, copyright 1994, Allegro MicroSystems, Inc.
Avant et al., "Analysis of magnetic proportional drive circuits for bipolar junction transistors" PESC 1985, pp. 375-381.
Maksimovic, et al, Impact of Digital Control in Power Electronics, International Symposium on Power Semiconductor Devices and ICS, 2004, pp. 2-22, Boulder, Colorado, USA.
Fairchild Semiconductor, Ballast Control IC, FAN 7711, Rev. 1.0.3, 2007, pp. 1-23, San Jose, California, USA.

Yao, Gang et al, Soft Switching Circuit for Interleaved Boost Converters, IEEE Transactions on Power Electronics, vol. 22, No. 1, Jan. 2007, pp. 1-8, Hangzhou China.
Stmicroelectronics, Transition Mode PFC Controller, Datasheet L6562, Rev. 8, Nov. 2005, pp. 1-16, Geneva, Switzerland.
Zhang, Wanfeng et al, A New Duty Cycle Control Strategy for Power Factor Correction and FPGA Implementation, IEEE Transactions on Power Electronics, vol. 21, No. 6, Nov. 2006, pp. 1-10, Kingston, Ontario, Canada.
Stmicroelectronics, Power Factor Connector L6561, Rev 16, Jun. 2004, pp. 1-13, Geneva, Switzerland.
Texas Instruments, Avoiding Audible Noise at Light Loads When Using Leading Edge Triggered PFC Converters, Application Report SLUA309A, Mar. 2004—Revised Sep. 2004, pp. 1-4, Dallas, Texas, USA.
Texas Instruments, Startup Current Transient of the Leading Edge Triggered PFC Controllers, Application Report SLUA321, Jul. 2004, pp. 1-4, Dallas, Texas, USA.
Texas Instruments, Current Sense Transformer Evaluation UCC3817, Application Report SLUA308, Feb. 2004, pp. 1-3, Dallas, Texas, USA.
Texas Instruments, BiCMOS Power Factor Preregulator Evaluation Board UCC3817, User's Guide, SLUU077C, Sep. 2000—Revised Nov. 2002, pp. 1-10, Dallas, Texas, USA.
Texas Instruments, Interleaving Continuous Conduction Mode PFC Controller, UCC28070, SLUS794C, Nov. 2007—Revised Jun. 2009, pp. 1-45, Dallas, Texas, USA.
Texas Instruments, 350-W Two-Phase Interleaved PFC Pre-regulator Design Review, Application Report SLUA369B, Feb. 2005—Revised Mar. 2007, pp. 1-22, Dallas, Texas, USA.
Texas Instruments, Average Current Mode Controlled Power Factor Correction Converter using TMS320LF2407A, Application Report SPRA902A, Jul. 2005, pp. 1-15, Dallas, Texas, USA.
Texas Instruments, Transition Mode PFC Controller, UCC28050, UCC28051, UCC38050, UCC38051, Application Note SLUS515D, Sep. 2002—Revised Jul. 2005, pp. 1-28, Dallas, Texas, USA.
Unitrode, High Power-Factor Preregulator, UC1852, UC2852, UC3852, Feb. 5, 2007, pp. 1-8, Merrimack, Maine, USA.
Unitrode, Optimizing Performance in UC3854 Power Factor Correction Applications, Design Note ON 39E, 1999, pp. 1-6, Merrimack, Maine, USA.
On Semiconductor Four Key Steps to Design a Continuous Conduction Mode PFC Stage Using the NCP1653, Application Note AND8184/D, Nov. 2004, pp. 1-8, Phoenix, AZ, USA.
Unitrode, BiCMOS Power Factor Preregulator, Texas Instruments, UCC2817, UCC2818, UCC3817, UCC3818, SLUS3951, Feb. 2000—Revised Feb. 2006, pp. 1-25, Dallas, Texas, USA.
Unitrode, UC3854AIB and UC3855A!B Provide Power Limiting with Sinusoidal Input Current for PFC Front Ends, SLUA196A, Design Note DN-66, Jun. 1995—Revised Nov. 2001, pp. 1-6, Merrimack, Maine, USA.
Unitrode, Programmable Output Power Factor Preregulator, UCC2819, UCC3819, SLUS482B, Apr. 2001—Revised Dec. 2004, pp. 1-16, Merrimack, Maine, USA.
Texas Instruments, UCC281019, 8-Pin Continuous Conduction Mode (CCM) PFC Controller, SLU828B, Revised Apr. 2009, pp. 1-48, Dallas, Texas, USA.
http://toolbarpdf.com/docs/functions-and-features-of=inverters. html, Jan. 20, 2011, pp. 1-8.
Zhou, Jinghai, et al, Novel Sampling Algorithm for DSP Controlled 2kW PFC Converter, IEEE Transactions on Power Electronics, vol. 16, No. 2, Mar. 2001, pp. 1-6, Hangzhou, China.
Mammano, Bob, Current Sensing Solutions for Power Supply Designers, Texas Instruments, 2001, pp. 1-36, Dallas, Texas, USA.
Fairchild Semiconductor, Ballast Control IC FAN7532, Rev. 1.0.3, Jun. 2006, pp. 1-16, San Jose, California, USA.
Fairchild Semiconductor, Simple Ballast Controller, FAN7544, Rev. 1.0.0, Sep. 21, 2004, pp. 1-14, San Jose, California, USA.
Texas Instruments, High Performance Power Factor Preregulator, UC2855A/B and UC3855A/B, SLUS328B, Jun. 1998, Revised Oct. 2005, pp. 1-14, Dallas, TX, USA.

(56) References Cited

OTHER PUBLICATIONS

Balogh, Laszlo, et al, Power-Factor Correction with Interleaved Boost Converters in Continuous-Inductr-Current Mode, 1993, IEEE, pp. 168-174, Switzerland.

Cheng, Hung L., et al, A Novel Single-Stage High-Power-Factor Electronic Ballast with Symmetrical Topology, Power Electronics and Motion Control Conference, 2006. IPEMC 2006. CES/IEEE 5th International, Aug. 14-16, 2006, vol. 50, No. 4, Aug. 2003, pp. 759-766, Nat. Ilan Univ., Taiwan.

Fairchild Semiconductor. Theory and Application of the ML4821 Average Current Mode PFC Controllerr, Fairchild Semiconductor Application Note 42030. Rev. 1.0, Oct. 25, 2000, pp. 1-19, San Jose, California, USA.

Garcia, 0., et al, High Efficiency PFC Converter to Meet EN610000302 and A14, Industrial Electronics, 2002. ISIE 2002. Proceedings of the 2002 IEEE International Symposium, vol. 3, pp. 975-980, Div. de Ingenieria Electronica, Univ. Politecnica de Madrid, Spain.

Infineon Technologies AG, Standalone Power Factor Correction (PFC) Controller in Continuous Conduction Mode (CCM), Infineon Power Management and Supply, CCM-PFC, ICE2PCS01, ICE2PCS01 G, Version 2.1, Feb. 6, 2007, p. 1-22, Munchen, Germany.

Lu, et al, Bridgeless PFC Implementation Using One Cycle Control Technique, International Rectifier, 2005, pp. 1-6, Blacksburg, VA, USA.

Brown, et al, PFC Converter Design with IR1150 One Cycle Control IC, International Rectifier, Application Note AN-1 077, pp. 1-18, El Segundo CA, USA.

International Rectifer, PFC One Cycle Control PFC IC, International Rectifier, Data Sheet No. PD60230 rev. C, IR1150(S)(PbF), IR11501(S)(PbF), Feb. 5, 2007, pp. 1-16, El Segundo, CA, USA.

International Rectifier, IRAC1150=300W Demo Board, User's Guide, Rev 3.0, International Rectifier Computing and Communications SBU—AC-DC Application Group, pp. 1-18, Aug. 2, 2005, El Segundo, CO USA.

Lai, Z., et al, A Family of Power-Factor-Correction Controller, Applied Power Electronics Conference and Exposition, 1997. APEC '97 Conference Proceedings 1997., Twelfth Annual, vol. 1, pp. 66-73, Feb. 23-27, 1997, Irvine, CA.

Lee, P, et al, Steady-State Analysis of an Interleaved Boost Converter with Coupled Inductors, IEEE Transactions on Industrial Electronics, vol. 47, No. 4, Aug. 2000, pp. 787-795, Hung Hom, Kowloon, Hong Kong.

Linear Technology, Single Switch PWM Controller with Auxiliary Boost Converter, Linear Technology Corporation, Data Sheet LT 1950, pp. 1-20, Milpitas, CA, USA.

Linear Technology, Power Factor Controller, Linear Technology Corporation, Data Sheet LT1248, pp. 1-12, Milpitas, CA, USA.

Supertex, Inc., HV9931 Unity Power Factor LED Lamp Driver, Supertex, Inc., Application Note AN-H52, 2007, pp. 1-20, Sunnyvale, CA, USA.

Ben-Yaakov, et al, The Dynamics of a PWM Boost Converter with Resistive Input, IEEE Transactions on Industrial Electronics, vol. 46., No. 3, Jun. 1999, pp. 1-8, Negev, Beer-Sheva, Israel.

Fairchild Semiconductor, Simple Ballast Controller, FAN7544, Rev. 1.0.0, Sep. 21, 2004, pp. 1-14, San Jose, California, USA Erickson, Robert W., et al, Fundamentals of Power Electronics, Second Edition, Chapter 6, 2001, pp. 131-184, Boulder CO, USA.

Stmicroelectronics, CFL/TL Ballast Driver Preheat and Dimming L6574, Sep. 2003, pp. 1-10, Geneva, Switzerland.

Fairchild Semiconductor, 500W Power-Factor-Corrected (PFC) Converter Design with FAN4810, Application Note 6004, Rev. 1.0.1, Oct. 31, 2003, pp. 1-14, San Jose, CA, USA.

Fairfield Semiconductor, Power Factor Correction (PFC) Basics, Application Note 42047, Rev. 0.9.0, Aug. 19, 2004, pp. 1-11, San Jose, CA, USA.

Fairchild Semiconductor, Design of Power Factor Correction Circuit Using FAN7527B, Application Note AN4121, Rev. 1.0.1, May 30, 2002, pp. 1-12, San Jose, CA, USA.

Fairchild Semiconductor, Low Start-Up Current PFC/PWM Controller Combos FAN4800, Rev. 1.0.6, Nov. 2006, pp. 1-20, San Jose, CA, USA.

Prodic, Aleksander, Compensator Design and Stability Assessment for Fast Voltage Loops of Power Factor Correction Rectifiers, IEEE Transactions on Power Electronics, vol. 22, Issue 5, Sep. 2007, pp. 1719-1730, Toronto, Canada.

Fairchild Semiconductor, ZVS Average Current PFC Controller FAN 4822, Rev. 1.0.1, Aug. 10, 2001, pp. 1-10, San Jose, CA, USA.

Prodic, et al, Dead-Zone Digital Controller for Improved Dynamic Response of Power Factor Preregulators, Applied Power Electronics Conference and Exposition, 2003, vol. 1, pp. 382-388, Boulder CA, USA.

Philips Semiconductors, 90W Resonant SMPS with TEA 1610 Swing Chip, Application Note AN99011, Sep. 14, 1999, pp. 1-28, The Netherlands.

Fairchild Semiconductor, Power Factor Correction Controller FAN7527B, Aug. 16, 2003, pp. 1-12, San Jose, CA, USA.

On Semiconductor, Power Factor Controller for Compact and Robust, Continuous Conduction Mode Pre-Converters, NCP1654, Mar. 2007, Rev. PO, pp. 1-10, Denver, CO, USA.

Fairchild Semicondctor, Simple Ballast Controller, KA7541, Rev. 1.0.3, Sep. 27, 2001, pp. 1-14, San Jose, CA, USA.

Fairchild Semiconductor, Power Factor Controller, ML4812, Rev. 1.0.4, May 31, 2001, pp. 1-18, San Jose, CA, USA.

Prodic, et al, Digital Controller for High-Frequency Rectifiers with Power Factor Correction Suitable for On-Chip Implementation, Power Conversion Conference—Nagoya, 2007. PCC '07, Apr. 2-5, 2007, pp. 1527-1531, Toronto, Canada.

Freescale Semiconductor, Dimmable Light Ballast with Power Factor Correction, Designer Reference Manual, DRM067, Rev. 1, Dec. 2005, M68HC08 Microcontrollers, pp. 1-72, Chandler, AZ, USA.

Freescale Semiconductor, Design of Indirect Power Factor Correction Using 56F800/E, Freescale Semiconductor Application Note, AN1965, Rev. 1, Jul. 2005, pp. 1-20, Chandler, AZ, USA.

Freescale Semiconductor, Implementing PFC Average Current Mode Control using the MC9S12E128, Application Note AN3052, Addendum to Reference Design Manual DRM064, Rev. 0, Nov. 2005, pp. 1-8, Chandler, AZ, USA.

Hirota, et al, Analysis of Single Switch Delta-Sigma Modulated Pulse Space Modulation PFC Converter Effectively Using Switching Power Device, Power Electronics Specialists Conference, 2002. pesc 02. 2002 IEEE 33rd Annual, vol. 2, pp. 682-686, Hyogo Japan.

Madigan, et al, Integrated High-Quality Rectifier-Regulators, Industrial Electronics, IEEE Transactions, vol. 46, Issue 4, pp. 749-758, Aug. 1999, Cary, NC, USA.

Renesas, Renesas Technology Releases Industry's First Critical-Conduction-Mode Power Factor Correction Control IC Implementing Interleaved Operations, R2A20112, pp. 1-4, Dec. 18, 2006, Tokyo, Japan.

Renesas, PFC Control IC R2A20111 Evaluation Board, Application Note R2A20111 EVB, all pages, Feb. 2007, Rev. 1.0, pp. 1-39, Tokyo, Japan.

Miwa, et al, High Efficiency Power Factor Correction Using Interleaving Techniques, Applied Power Electronics Conference and Exposition, 1992. APEC '92. Conference Proceedings 1992., Seventh Annual, Feb. 23-27, 1992, pp. 557-568, MIT, Cambridge, MA, USA.

Noon, Jim, High Performance Power Factor Preregulator UC3855A!B, Texas Instruments Application Report, SLUA146A, May 1996—Revised Apr. 2004, pp. 1-35, Dallas TX, USA.

NXP Semiconductors, TEA1750, GreenChip III SMPS Control IC Product Data Sheet, Rev.01, Apr. 6, 2007, pp. 1-29, Eindhoven, The Netherlands.

Turchi, Joel, Power Factor Correction Stages Operating in Critical Conduction Mode, On Semiconductor, Application Note AND8123/D, Sep. 2003—Rev. 1 , pp. 1-20, Denver, CO, USA.

On Semiconductor, Greenline Compact Power Factor Controller: Innovative Circuit for Cost Effective Solutions, MC33260, Semiconductor Components Industries, Sep. 2005—Rev. 9, pp. 1-22, Denver, CO, USA.

(56) References Cited

OTHER PUBLICATIONS

On Semiconductor, Enhanced, High Voltage and Efficient Standby Mode, Power Factor Controller, NCP1605, Feb. 2007, Rev. 1, pp. 1-32, Denver, CO, USA.
On Semiconductor, Cost Effective Power Factor Controller, NCP1606, Mar. 2007, Rev. 3, pp. 1-22, Denver, CO, USA.
Renesas, Power Factor Correction Controller IC, HA16174PIFP, Rev. 1.0, Jan. 6, 2006, pp. 1-38, Tokyo, Japan.
Seidel, et al, A Practical Comparison Among High-Power-Factor Electronic Ballasts with Similar Ideas, IEEE Transactions on Industry Applications, vol. 41, No. 6, Nov./Dec. 2005, pp. 1574-1583, Santa Maria, Brazil.
Stmicroelectronics, Electronic Ballast with PFC using L6574 and L6561. Application Note AN993, May 2004, pp. 1-20, Geneva, Switzerland.
Stmicroelectronics, Advanced Transition-Mode PFC Controller L6563 and L6563A, Mar. 2007, pp. 1-40, Geneva, Switzerland.
Su, et al, "Ultra Fast Fixed-Frequency Hysteretic Buck Converter with Maximum Charging Current Control and Adaptive Delay Compensation for DVS Applications", IEEE Journal of Solid-Slate Circuits, vol. 43, No. 4, Apr. 2008, pp. 815-822, Hong Kong University of Science and Technology, Hong Kong, China.
Wong, et al, "Steady State Analysis of Hysteretic Control Buck Converters", 2008 13th International Power Electronics and Motion Control Conference (EPE-PEMC 2008), pp. 400-404, 2008, National Semiconductor Corporation, Power Management Design Center, Hong Kong, China.
Zhao, et al, Steady-State and Dynamic Analysis of a Buck Converter Using a Hysteretic PWM Control, 2004 35th Annual IEEE Power Electronics Specialists Conference, pp. 3654-3658, Department of Electrical & Electronic Engineering, Oita University, 2004, Oita, Japan.
International Search Report, PCT/US2012/069942, European Patent Office, Jul. 21, 2014, pp. 1-5.
Written Opinion, PCT/US2012/069942, European Patent Office, Jul. 21, 2014, pp. 1-8.
International Search Report, PCT/US2014/021921, European Patent Office, Jun. 23, 2014, pp. 1-3.
Written Opinion, PCT/US2014/021921, European Patent Office, Jun. 23, 2014, pp. 1-5.

* cited by examiner

SINGLE PIN CONTROL OF BIPOLAR JUNCTION TRANSISTOR (BJT)-BASED POWER STAGE

CROSS-REFERENCE TO RELATED APPLICATIONS

This application claims the benefit of priority of U.S. Provisional Patent Application No. 61/824,725 filed on May 17, 2013 to Ramin Zanbaghi et al. entitled "Embedded Auxiliary Chip-Supply Path Using the BJT Switch Reverse Recovery Time in the Power Converter Stages," which is incorporated by reference herein. This application is related to U.S. Non-provisional patent application Ser. No. 14/280,539 filed on May 16, 2014 entitled "Charge Pump-based Drive Circuitry for Bipolar Junction Transistor (BJT)-based Power Supply," the entire contents of which are specifically incorporated by reference herein without disclaimer.

FIELD OF THE DISCLOSURE

The instant disclosure relates to power supply circuitry. More specifically, this disclosure relates to power supply circuitry for lighting devices.

BACKGROUND

Alternative lighting devices to replace incandescent light bulbs differ from incandescent light bulbs in the manner that energy is converted to light. Incandescent light bulbs include a metal filament. When electricity is applied to the metal filament, the metal filament heats and glows, radiating light into the surrounding area. The metal filament of conventional incandescent light bulbs generally has no specific power requirements. That is, any voltage and any current may be applied to the metal filament, because the metal filament is a passive device. Although the voltage and current need to be sufficient to heat the metal filament to a glowing state, any other characteristics of the delivered energy to the metal filament do not affect operation of the incandescent light bulb. Thus, conventional line voltages in most residences and commercial buildings are sufficient for operation of the incandescent bulb.

However, alternative lighting devices, such as compact fluorescent light (CFL) bulbs and light emitting diode (LED)-based bulbs, contain active elements that interact with the energy supply to the light bulb. These alternative devices are desirable for their reduced energy consumption, but the alternative devices have specific requirements for the energy delivered to the bulb. For example, compact fluorescent light (CFL) bulbs often have an electronic ballast designed to convert energy from a line voltage to a very high frequency for application to a gas contained in the CFL bulb, which excites the gas and causes the gas to glow. In another example, light emitting diode (LEDs)-based bulbs include a power stage designed to convert energy from a line voltage to a low voltage for application to a set of semiconductor devices, which excites electrons in the semiconductor devices and causes the semiconductor devices to glow. Thus, to operate either a CFL bulb or LED-based bulb, the line voltage must be converted to an appropriate input level for the lighting device of a CFL bulb or LED-based bulb. Conventionally, a power stage is placed between the lighting device and the line voltage to provide this conversion. Although a necessary component, this power stage increases the cost of the alternate lighting device relative to an incandescent bulb.

One conventional power stage configuration is the buck-boost power stage. FIG. 1 is a circuit schematic showing a buck-boost power stage for a light-emitting diode (LED)-based bulb. An input node 102 receives an input voltage, such as line voltage, for a circuit 100. The input voltage is applied across an inductor 104 under control of a switch 110 coupled to ground. When the switch 110 is activated, current flows from the input node 102 to the ground and charges the inductor 104. A diode 106 is coupled between the inductor 104 and light emitting diodes (LEDs) 108. When the switch 110 is deactivated, the inductor 104 discharges into the light emitting diodes (LEDs) 108 through the diode 106. The energy transferred to the light emitting diodes (LEDs) 108 from the inductor 104 is converted to light by LEDs 108.

The conventional power stage configuration of FIG. 1 provides limited control over the conversion of energy from a source line voltage to the lighting device. The only control available is through operation of the switch 110 by a controller. However, that controller would require a separate power supply or power stage circuit to receive a suitable voltage supply from the line voltage. Additionally, the switch 110 presents an additional expense to the light bulb containing the power stage. Because the switch 110 is coupled to the line voltage, which may be approximately 120-240 Volts RMS with large variations, the switch 110 must be a high voltage switch, which are large, difficult to incorporate into small bulbs, and expensive.

Shortcomings mentioned here are only representative and are included simply to highlight that a need exists for improved power stages, particularly for lighting devices and consumer-level devices. Embodiments described here address certain shortcomings but not necessarily each and every one described here or known in the art.

SUMMARY

A bipolar junction transistor (BJT) may be used as a switch for controlling a power stage of a lighting device, such as a light-emitting diode (LED)-based light bulb. Bipolar junction transistors (BJTs) may be suitable for high voltage applications, such as for use in the power stage and coupled to a line voltage. Further, bipolar junction transistors (BJTs) are lower cost devices than conventional high voltage field effect transistors (HV FETs). Thus, implementations of power stages having bipolar junction transistor (BJT) switches may be lower cost than power stage implementations having field effect transistor (FET) switches.

In some embodiments, a bipolar junction transistor (BJT) of a power stage may be controlled by a controller through a single pin. The controller may include circuitry for monitoring voltages and/or currents within the power stage and for providing feedback to the bipolar junction transistor (BJT) through a single pin. The single control pin of the controller may be coupled to an emitter of the bipolar junction transistor (BJT).

In some embodiments, a controller coupled to the bipolar junction transistor (BJT) controls operation of the power stage with a switch coupled to the emitter of the bipolar junction transistor (BJT) through the single pin. The switch may be toggled on and off by the controller to control delivery of energy to a lighting load, such as from an energizing inductor to a set of light emitting diodes (LEDs). By operating the switch, the controller may define a time period for charging the energizing inductor from the line voltage and discharging the energizing inductor into the set of light emitting diodes (LEDs) to generate light.

Control through the emitter pin of the bipolar junction transistor (BJT), rather than through a base pin, may allow reverse recovery of charge from the bipolar junction transistor (BJT). In some embodiments, a controller coupled to the bipolar junction transistor (BJT) may receive energy for operation through reverse recovery of current from the bipolar junction transistor (BJT). For example, during a first time period, during which the controller configures the bipolar junction transistor (BJT) for charging the energizing inductor, a base charge may be accumulated at a base of the bipolar junction transistor (BJT). During a second time period, during which the controller configures the bipolar junction transistor (BJT) to allow the energizing inductor to discharge into the set of light emitting diodes (LEDs), the accumulated base charge may be discharged to provide power supply for the controller.

According to one embodiment, an apparatus may include an integrated circuit (IC) configured to couple to a bipolar junction transistor (BJT) through a single pin that is configured to couple to an emitter of the bipolar junction transistor (BJT). The integrated circuit (IC) may include a switch configured to couple to the emitter of the bipolar junction transistor (BJT) and a controller coupled to the switch and configured to control delivery of power to a load by operating the switch and, optionally, configured to sense a current through the bipolar junction transistor (BJT).

In some embodiments, the apparatus may also include a bipolar junction transistor (BJT) including a base, an emitter, and a collector, wherein the emitter is coupled to the integrated circuit (IC); a base drive circuit coupled to the base of the bipolar junction transistor (BJT), wherein the base drive circuit is configured to bias the base of the bipolar junction transistor (BJT) from a power supply node; a current detector coupled to the switch and configured to detect when a current from the emitter of the bipolar junction transistor (BJT) reaches a threshold value, wherein the controller is configured to turn off the switch when the current detector detects the threshold value is reached; a reverse-recovery control circuit configured to be coupled to the emitter of the bipolar junction transistor (BJT) and configured to be coupled to a power supply node, wherein the reverse-recovery control circuit is configured to regulate a discharge current from the base of the bipolar junction transistor (BJT) to the power supply node; a capacitive coupling that is configured to be coupled between the emitter and a collector of the bipolar junction transistor (BJT); and/or a zero current detection block configured to be coupled to the emitter of the bipolar junction transistor (BJT) and configured to detect a ringing at the collector of the bipolar junction transistor (BJT) through the high-pass filter.

In certain embodiments, the power supply node may be coupled to an external source; the controller may be configured to turn on the switch to direct current to charge an inductor during a first time period, during which a base charge is accumulated at the base of the bipolar junction transistor (BJT) and turn off the switch to begin a reverse recovery of the base charge at the base of the bipolar junction transistor (BJT); the controller may be configured to cause the bipolar junction transistor (BJT) to discharge a base charge from the base of the bipolar junction transistor (BJT) until the bipolar junction transistor (BJT) turns off, after which current from the inductor is directed to a lighting load; the reverse recovery of the charge may be used to charge a chip supply for the integrated circuit (IC by redirecting current from the emitter of the BJT through the IC); the current detector may include a sense resistor that can be coupled to the emitter of the bipolar junction transistor (BJT), a comparator coupled to the sense resistor and wherein the comparator can be coupled to a threshold voltage corresponding to the threshold value, wherein the comparator is configured to output a comparator signal based, at least in part, on a comparison of a voltage at the emitter of the bipolar junction transistor (BJT) and the threshold voltage, and wherein the controller is configured to turn off the switch based, at least in part, on the comparator signal; the reverse recovery control circuit may include a plurality of diodes and a plurality of switches corresponding to the plurality of diodes, each of the plurality of switches being coupled in parallel with one of the plurality of diodes; the controller may be coupled to the current detection block and configured to turn on the switch after the ringing is detected; the controller may be configured to detect a valley of the ringing and turn on the switch approximately at the valley of the ringing; and/or the capacitive coupling may include a high-pass filter (HPF) including a capacitor configured to be coupled to the emitter and the collector of the bipolar junction transistor (BJT) and a resistor configured to be coupled to the emitter of the bipolar junction transistor (BJT).

According to another embodiment, a method may include configuring an integrated circuit (IC) to control a bipolar junction transistor (BJT) through a single pin that is configured to couple the integrated circuit (IC) to the bipolar junction transistor (BJT); controlling, by the integrated circuit (IC), delivery of power to a load by operating a switch configured to couple to an emitter of the bipolar junction transistor (BJT); and sensing, by the integrated circuit (IC), current through the bipolar junction transistor (BJT) through the single pin.

In some embodiments, the method may also include coupling the integrated circuit (IC) to the bipolar junction transistor (BJT); biasing a base of the bipolar junction transistor (BJT) with an approximately fixed voltage from a power supply node; turning on the switch to direct current to the load during a first time period, during which a base charge is accumulated at a base of the bipolar junction transistor (BJT); turning off the switch to begin a reverse recovery of the base charge at the base of the bipolar junction transistor (BJT); recovering current from the base charge at the base of the bipolar junction transistor (BJT) to supply a controller; detecting when an emitter current from the emitter of the bipolar junction transistor (BJT) reaches a threshold value; turning off the switch after detecting the emitter current reaches the threshold value; and/or regulating a discharge of the base charge from the base of the bipolar junction transistor (BJT).

In certain embodiments, turning off the switch may cause the bipolar junction transistor (BJT) to discharge a base charge from the base of the bipolar junction transistor (BJT) until the bipolar junction transistor (BJT) turns off, after which current from the inductor maybe directed to a lighting load; the step of detecting may include comparing a voltage at a sense resistor coupled to the emitter of the bipolar junction transistor (BJT) with a reference voltage; and/or the step of regulating may include shorting out one or more diodes.

According to a further embodiment, an apparatus may include a lighting load comprising a plurality of light emitting diodes (LEDs); a bipolar junction transistor (BJT) comprising a base, the emitter, and a collector, wherein the collector of the bipolar junction transistor (BJT) is coupled to an input node; and/or an integrated circuit (IC) configured to couple to the bipolar junction transistor (BJT) through a single pin that is configured to couple to an emitter of the bipolar junction transistor (BJT). The integrated circuit (IC) may include a switch configured to couple to the emitter of the bipolar junction transistor (BJT); and/or a controller coupled to the switch and configured to control delivery of power to the lighting load by operating the switch and, optionally, configured to sense a current through the bipolar junction transistor (BJT).

In some embodiments, the apparatus may also include a rectifier coupled to the input node; a dimmer coupled to the rectifier; a line voltage input node coupled to the dimmer; a current sensor coupled to the switch and configured to detect when a current from the emitter of the bipolar junction transistor (BJT) reaches a threshold value, wherein the controller is configured to operate the switch based on the current sensor detecting the current reaching the threshold value; a reverse recovery control circuit configured to be coupled to the base of the bipolar junction transistor (BJT), wherein the controller is configured to operate the reverse recovery control circuit to regulate a discharge of base current from the base of the bipolar junction transistor (BJT); and/or a zero current detect (ZCD) circuit configured to be coupled to the emitter of the bipolar junction transistor (BJT), wherein the zero current detect (ZCD) circuit is further configured to detect a discharge of an inductor coupled to a collector of the bipolar junction transistor (BJT).

In certain embodiments, the controller and the switch may be integrated into an integrated circuit (IC), wherein the integrated circuit (IC) controls operation of the bipolar junction transistor (BJT) through a single pin; and/or the controller may be configured to operate the switch based, at least in part, on the detection of the discharge of the inductor by the zero current detect (ZCD) circuit.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

A bipolar junction transistor (BJT) may control delivery of power to a lighting device, such as light emitting diodes (LEDs). The bipolar junction transistor (BJT) may be coupled to a high voltage source, such as a line voltage, and may control delivery of power to the LEDs. The bipolar junction transistor (BJT) is a low cost device that may reduce the price of alternative light bulbs. In some embodiments, the bipolar junction transistor (BJT) may be controlled through a single pin connection from a controller. For example, a controller may include a switch coupled through a single pin to an emitter of the bipolar junction transistor (BJT).

Figure 1:
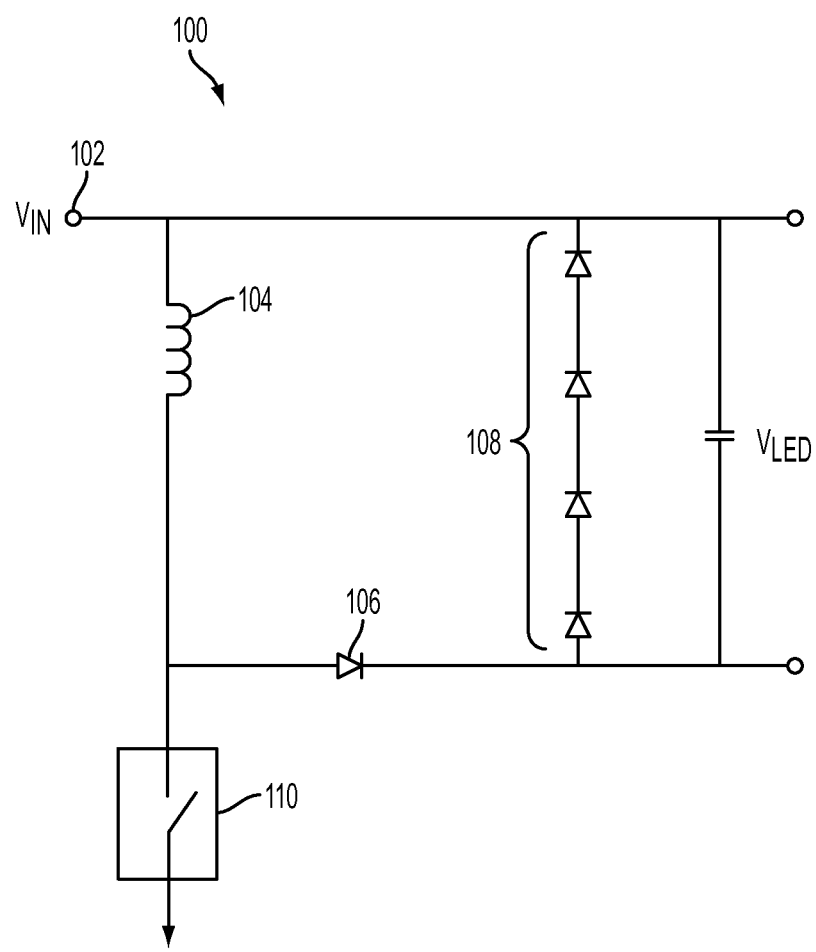
FIG. 1 is a circuit schematic illustrating a buck-boost power stage for a light-emitting diode (LED)-based bulb in accordance with the prior art.
Figure 2:
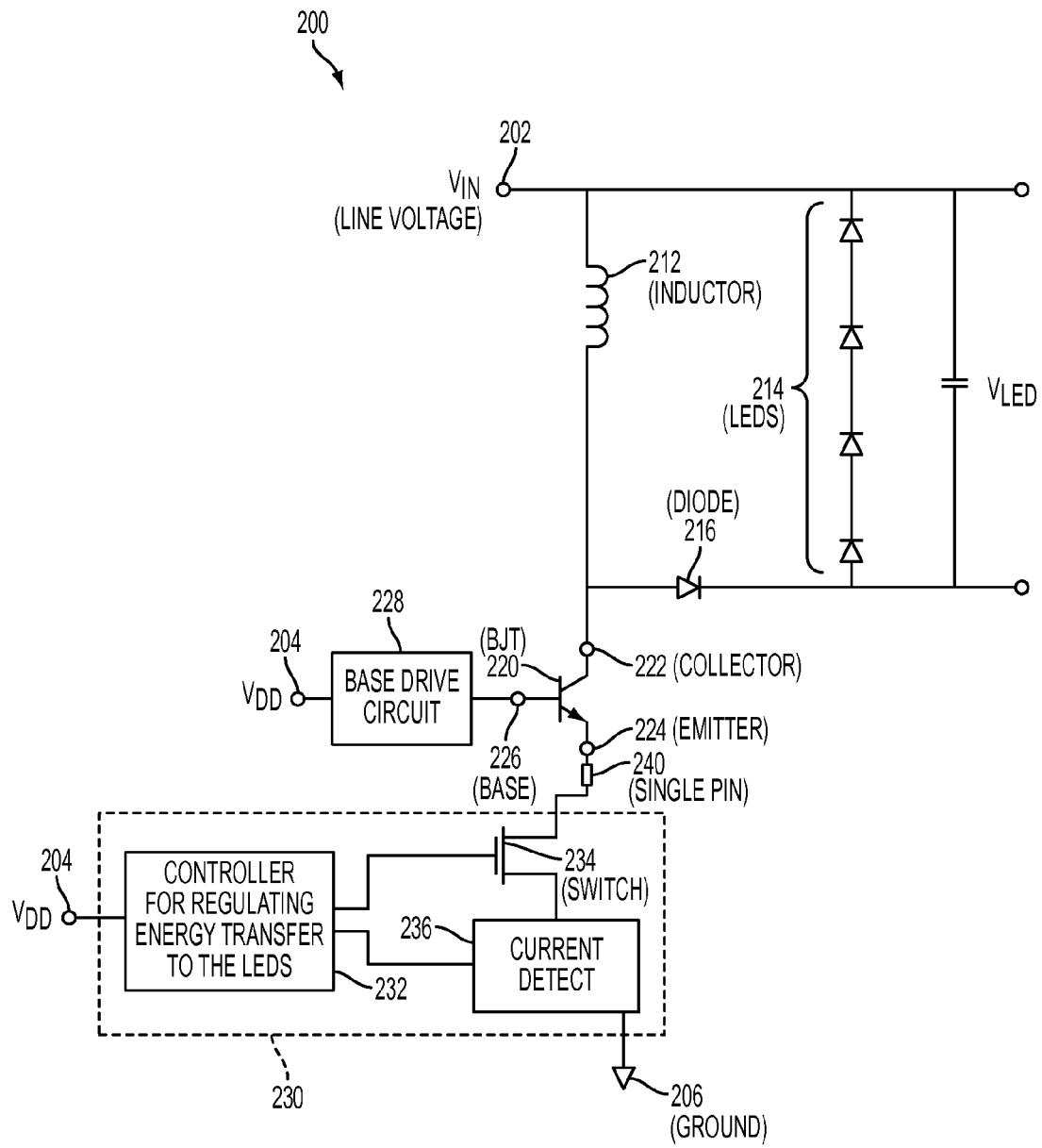
FIG. 2 is a circuit schematic illustrating a power stage having an emitter-controlled bipolar junction transistor (BJT) according to one embodiment of the disclosure.

FIG. 2 is a circuit schematic illustrating a power stage having an emitter-controlled bipolar junction transistor (BJT) according to one embodiment of the disclosure. A circuit 200 may include a bipolar junction transistor (BJT) 220 having a collector node 222, an emitter node 224, and a base node 226. The collector 222 may be coupled to a high voltage input node 202 and a lighting load 214, such as a plurality of light emitting diodes (LEDs). An inductor 212 and a diode 216 may be coupled between the high voltage input node 202 and the lighting load 214.

The emitter node 224 of the BJT 220 may be coupled to an integrated circuit (IC) 230, which may include a controller 232, a switch 234, and a current detect circuit 236. The IC 230 may be coupled to the BJT 220 through a single pin 240 to the emitter node 224. For example, the switch 234 may be coupled in a current path from the emitter node 224 to a ground 206. The current detect circuit 236 may be coupled between the switch 234 and the ground 206. The controller 232 may control power transfer from the input node 202 to the lighting load 214 by operating the switch 234 to couple and/or disconnect the emitter node 224 of the BJT 220 to the ground 206. The current detect circuit 236 may provide feedback to the controller 232 regarding current flowing through the BJT 220 while the switch 234 is turned on to couple the emitter node 224 to the ground 206.

The base node 226 of the BJT 220 may be coupled to a supply voltage input node 204 through a base drive circuit 228. The base drive circuit 228 may be configured to provide a relatively fixed bias voltage to the base node 226 of the BJT 220, such as during a time period when the switch 234 is switched on.

The controller 232 may control delivery of power to the lighting load 214. When the controller 232 turns on the switch 234, current flows from the high voltage input node 202, through the inductor 212, the BJT 220, the switch 234, to the ground 206. During this time period, the inductor 212 is charging from the electromagnetic fields generated by the current. When the controller 232 turns off the switch 234, current flows from the inductor 212, through the diode 216, and through the lighting load 214. The lighting load 214 is thus powered from the energy stored in the inductor 212, which was stored during the time period when the controller 232 turned on the switch 234. The controller 232 may repeat the process of turning on and off the switch 234 to control delivery of energy to the lighting load 214. Control of delivery of energy from a high voltage source may be possible in the circuit 200 without exposing the IC 230 or the controller 232 to the high voltage source.

The controller 232 may decide the first duration of time to hold the switch 234 on and the second duration of time to hold the switch 234 off based on feedback from the current detect circuit 236. For example, the controller 232 may turn off the switch 234 after the current detect circuit 236 detects current exceeding a first current threshold. A level of current detected by the current detect circuit 236 may provide the controller 232 with information regarding a charge level of the inductor 212.

Figure 3:
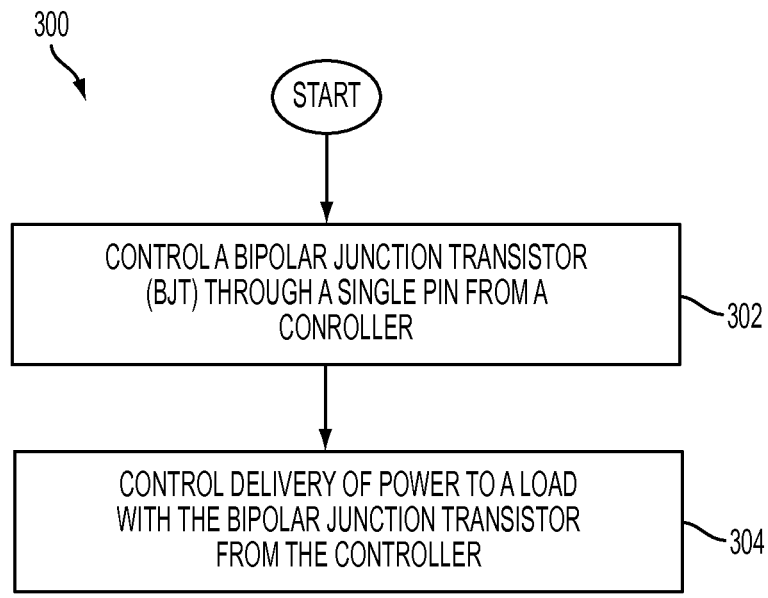
FIG. 3 is a flow chart illustrating controlling delivery of power to a lighting load with a bipolar junction transistor (BJT) according to one embodiment of the disclosure.

As described above with reference to FIG. 2, the bipolar junction transistor (BJT) may be controlled through a single pin and that BJT controlled to delivery power to a load. FIG. 3 is a flow chart illustrating controlling delivery of power to a lighting load with a bipolar junction transistor (BJT) according to one embodiment of the disclosure. A method 300 begins at block 302 with controlling a bipolar junction transistor (BJT) through a single pin from a controller. In one embodiment, the single pin is coupled to the emitter of the BJT creating an emitter-switched BJT power stage for a light bulb. At block 304, the controller controls delivery of power to a lighting load with the bipolar junction transistor (BJT). By using the bipolar junction transistor (BJT) to control delivery of power to the lighting load, the controller may be separated from the high voltage source. For example, as shown above in FIG. 2, the high voltage input node 202 is coupled to the BJT 220. Although the switch 234 is coupled to the BJT 220, the switch 234 and the controller 232 are not subjected to the high voltages present at the input node 202. At least some power for the controller 232 may be generated from the BJT 220 through a reverse recovery process.

Figure 4:
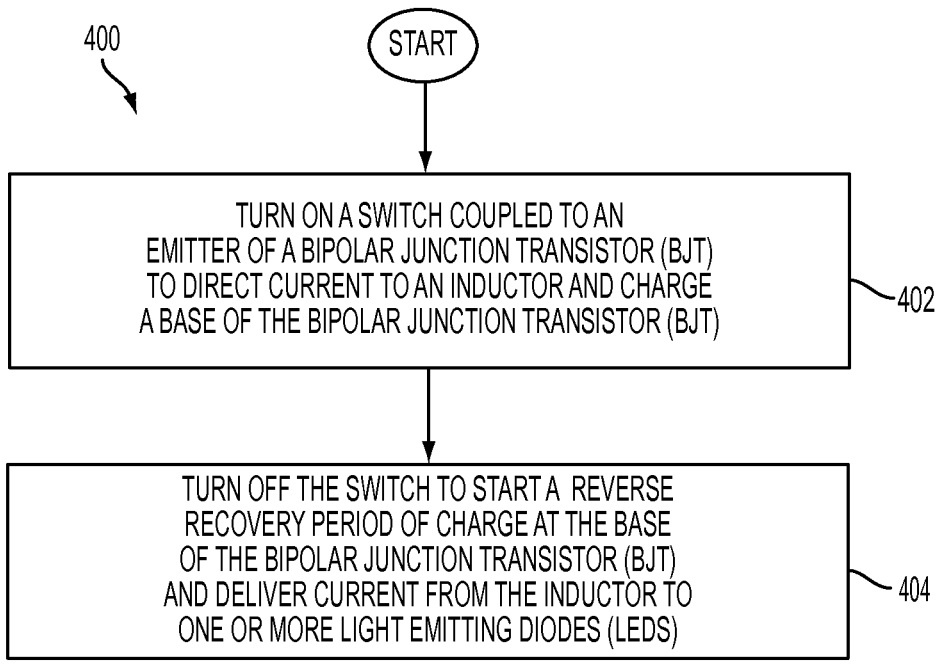
FIG. 4 is a flow chart illustrating controlling delivery of power to a lighting load with a bipolar junction transistor (BJT) with reverse recovery according to one embodiment of the disclosure.

While the controller is controlling delivery of energy to the lighting load, the controller may also control a reverse recovery period of the BJT. For example, when the switch is operated by the controller, the controller may also control a reverse recovery time period for the bipolar junction transistor (BJT) to return energy to a power supply. Charge may be stored at a base of the bipolar junction transistor (BJT) while the switch is on to allow the BJT to continue operating for a short duration after a base current supply is turned off. During this short time period while the BJT is conducting, energy may be redirected form the emitter of the BJT to charge a supply voltage. This energy may be used to provide power to the controller. For example, energy may be transferred to the capacitor 908 for supply voltage $V_{DD}$ from the collector node 922 though the emitter node 924. FIG. 4 is a flow chart illustrating controlling delivery of power to a lighting load with a bipolar junction transistor (BJT) with reverse recovery according to one embodiment of the disclosure. A method 400 begins at block 402 with turning on a switch coupled to an emitter of a bipolar junction transistor (BJT) to direct current to an inductor, during which a base of the bipolar junction transistor (BJT) may be charged. At block 404, the switch is turned off to start a reverse recovery period for returning charge from the base of the bipolar junction transistor (BJT) and to deliver current from the inductor to one or more light emitting diodes (LEDs) of a light bulb. The controller may cycle through blocks 402 and 404 to regulate transfer of energy to the light emitting diodes (LEDs), which may provide power to the light bulb and may regulate a brightness of light output by the light bulb. The controller may cycle through block 402 and 404 at a fast enough frequency that the eye cannot detect any variation in output light from the light bulb.

Figure 5:
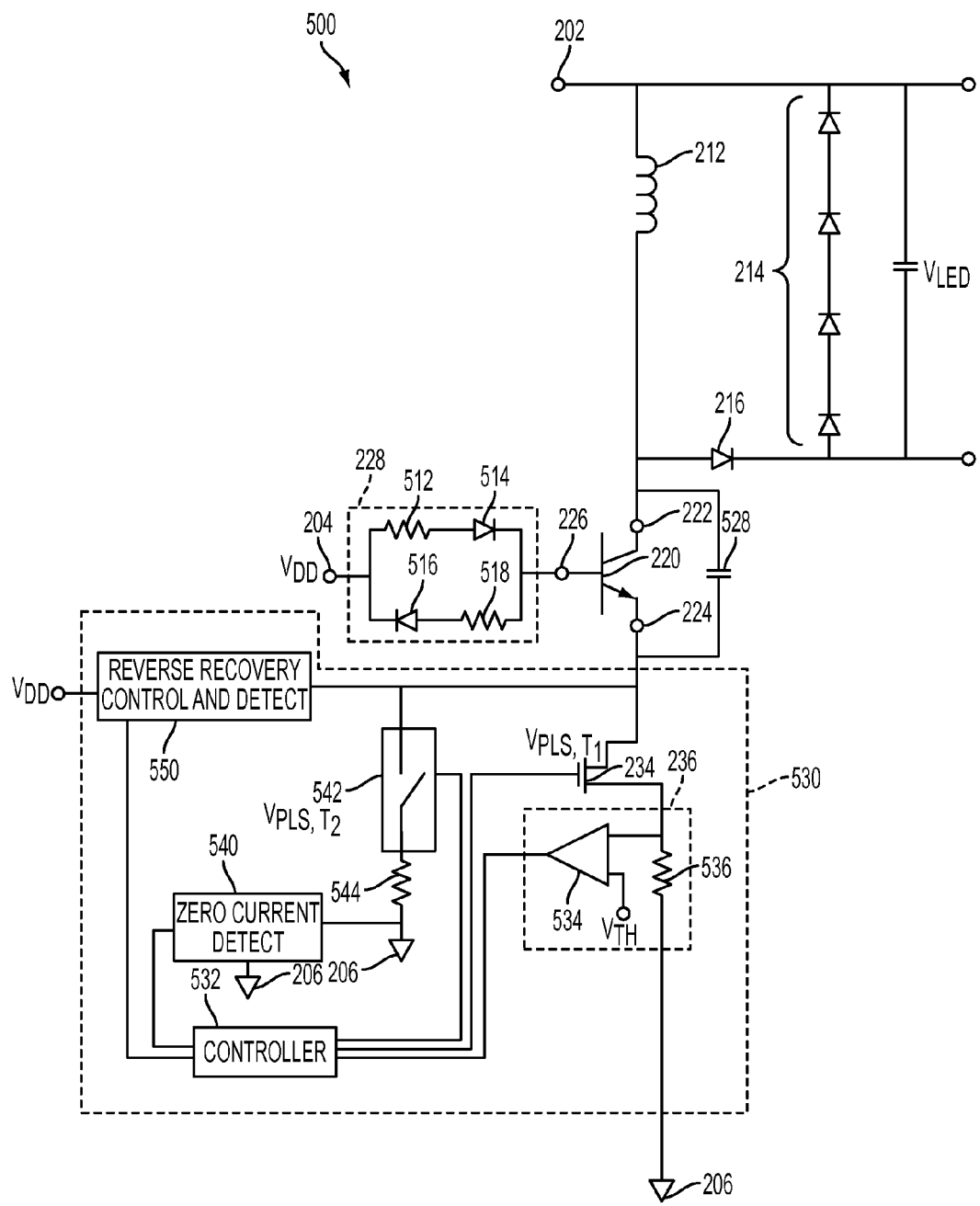
FIG. 5 is a circuit schematic illustrating a power stage having an emitter-controlled bipolar junction transistor (BJT) with reverse recovery control and zero current detection according to one embodiment of the disclosure.

Additional circuitry may provide feedback to the controller for regulating energy transfer to the lighting load. For example, a zero current detect (ZCD) circuit and a reverse recovery control and detect circuit may be coupled to the emitter of the bipolar junction transistor (BJT). FIG. 5 is a circuit schematic illustrating a power stage having an emitter-controlled bipolar junction transistor (BJT) with reverse recovery control and zero current detection according to one embodiment of the disclosure. A circuit 500 may include bipolar junction transistor (BJT) 220 coupled to an integrated circuit (IC) 530 through the emitter node 224. The IC 530 may include a controller 532, which may be similar to the controller 232. The IC 530 may also include zero current detect circuit 540 and reverse recovery control and detect circuit 550. The controller 532 may use information from the circuits 540 and 550 to determine when to switch on and/or off the switch 234 and regulate energy transfer to the lighting load 214.

Information about energy transfer from the inductor 212 to the lighting load 214 may be received by the controller 532 from the zero current detect circuit 540. In one embodiment, this information may include a calculated time estimating a time when zero current occurs by estimating, indirectly, the time at which the current reaches or reached zero in the inductor. This information about the energy transfer may be used by the controller 532 to determine when to switch on and/off the switch 234. The zero current detect circuit 540 may be coupled to the ground 206, a switch 542, and a resistor 544. When the switch 542 is switched on, the zero current detect circuit 540 and the resistor 544 may be coupled to the emitter node 224. A high-pass filter (HPF) may couple the emitter node 224 to the collector node 222. The zero current detect circuit 540 may thus sense a voltage at the collector node 222 to determine when a current through the inductor 212 and the lighting load 214 reaches zero. For example, the zero current detect circuit 540 may detect a ringing at the collector node 222 and provide feedback to the controller 532 about the presence of the ringing. In one embodiment, the zero current detect circuit 540 may monitor zero crossings of the ringing because the high-pass filter (HPF) acts as a differentiator of the voltage at the collector node 222. The collector node 222 may ring, such as oscillate between two voltages, when the inductor 212 fully discharges into the lighting load 214 such that there is approximately zero current through the lighting load 214. The controller 532 may use information about when the inductor 212 is fully discharged to determine when to switch on the switch 234, which initiates charging of the inductor 212.

Figure 6:
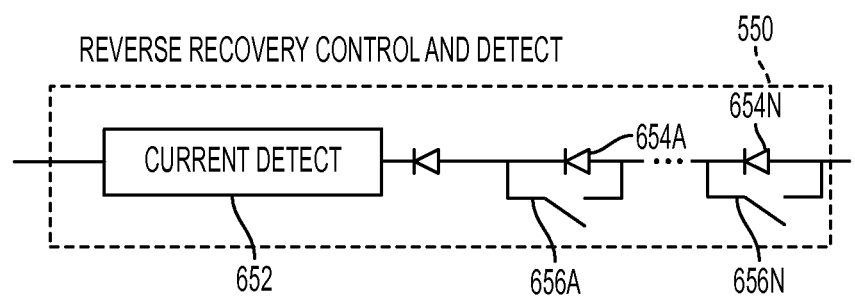
FIG. 6 is a circuit schematic illustrating a reverse recovery control and detect circuit according to one embodiment of the disclosure.

Information about reverse recovery of the BJT 220 may be received by the controller 532 from the reverse recovery control and detect circuit 550. This information may include a base current value and may be used by the controller 532 to determine when to switch on and/or off the switch 234. The controller 532 may also regulate a level of the base current during the reverse recovery period. One embodiment of a reverse recovery control and detect circuit 550 is shown in FIG. 6. FIG. 6 is a circuit schematic illustrating a reverse recovery control and detect circuit according to one embodiment of the disclosure. The circuit 550 may include a current detect circuit 652, such as a sense resistor, for detecting a level of the base current during reverse recovery of the BJT 220. The circuit 550 may also include diodes 654A-N coupled in series with the current detect circuit 652. The diodes 654A-N may be coupled in parallel with corresponding switches 656A-N. The switches 656A-N may be switched on to short out some of the diodes 654A-N and effectively set a number of diodes, N, in the circuit 550. The switches 656A-N may thus be operated by the controller 532 to set a base current during reverse recovery.

During regulation of the energy transfer to the lighting load 214 by the BJT 220 and the controller 532, a reverse recovery period of the BJT may be used to generate a power supply for the controller 532. For example, during the first time period, when the switch 234 is on, a current supplied to the base node 226 may be approximately:

$$I_b = \frac{V_{DD} - V_{BE} - V_{D1,th}}{R_b},$$

where $V_{DD}$ is a voltage at input node 204, $V_{BE}$ is a voltage between the base node 226 and the emitter node 224, $R_b$ is a resistance in the base drive circuit 228, and $V_{D1,th}$ is a threshold for turning on a forward-biased diode in the base drive circuit 228. After the switch 234, the reverse recovery period for the BJT 220 may start and a current supplied from the base node 226 may be approximately:

$$I_b = \frac{NV_{D,th} + V_{BE} - V_{D3,th}}{R_b},$$

where $V_{D3,th}$ is a threshold voltage for turning a reverse-biased diode in the base drive circuit 228, and N is a number of diodes in the forward-biased direction. The number of diodes, N, may be controlled to adjust a current supplied from the base node 226. A higher number of diodes, N, increases the current supplied from the base node 226. Because a fixed charge exists on the base node 226, a higher number of diodes, N, will decrease a time duration of the reverse recovery period. That is, the charge stored at the base node 226 will be discharged faster.

Referring back to FIG. 5, in one embodiment, the base drive circuit 228 of circuit 500 may include a forward-biased diode 514 in series with a resistor 512. The diode 514 and resistor 512 may be coupled in parallel with a series connection of a reverse-biased diode 516 and a resistor 518. Depending on a voltage at the base node 226, current may flow through the resistor 512 and the diode 514 or through the resistor 518 and the diode 516.

In one embodiment, the current detect circuit 236 may include a sense resistor 536 coupled between the switch 234 and the ground 206. The circuit 236 may also include a comparator 534 for comparing a voltage across the sense resistor 536 with a threshold voltage, $V_{TH}$, and provide a result of the comparison to the controller 532.

The controller 532 may receive feedback from the current detect circuit 236, the zero current detect circuit 540, and the reverse recovery control and detect circuit 550. The controller 532 may use feedback from these inputs to determine when to switch on or off the switch 234 and the switch 542. The controller 532 may output a $V_{PLS,T1}$ signal to control the switch 532 and a $V_{PLS,T2}$ signal to control the switch 542.

Figure 7:
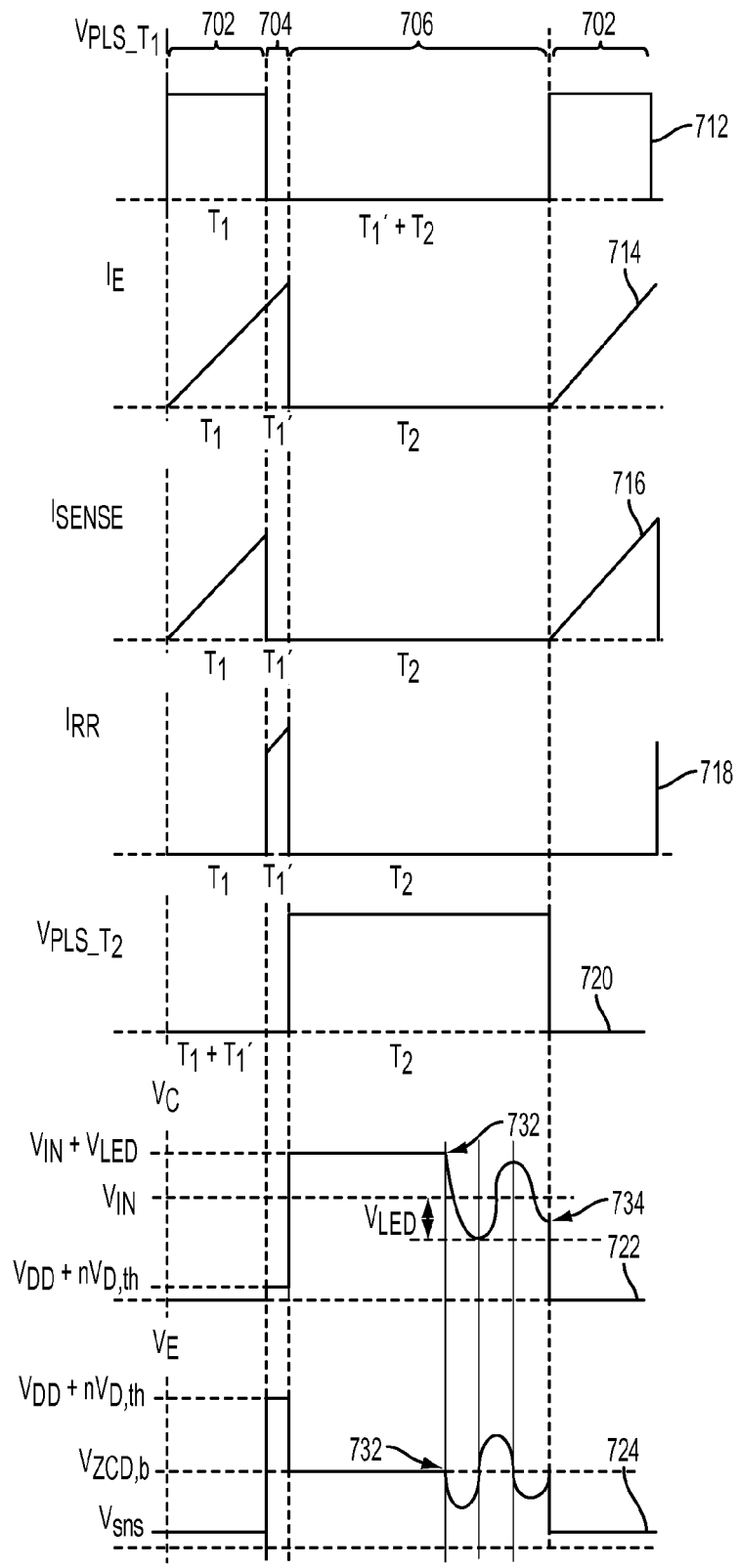
FIG. 7 are graphs illustrating timing diagrams for operating an emitter-switched bipolar junction transistor (BJT) according to one embodiment of the disclosure.

One method of operation of the circuit 500 under control of the controller 532 is shown through timing diagrams in FIG. 7. FIG. 7 are graphs illustrating a timing diagram for operating an emitter-switched bipolar junction transistor (BJT) according to one embodiment of the disclosure. FIG. 7 includes graphs 712-724. Graph 712 illustrates a $V_{PLS,T1}$ signal generated by the controller 532 for operating the switch 234. Graph 714 illustrates a current, $I_E$, at the emitter node 224. Graph 716 illustrates a current, $I_{sense}$, in the current detect circuit 236. Graph 718 illustrates a current, $I_{RR}$, in the reverse recovery control and detect circuit 550. Graph 720 illustrates a $V_{PLS,T2}$ signal generated by the controller 532 for operating the switch 542. Graph 722 illustrates a voltage, $V_C$, at the collector node 222. Graph 724 illustrates a voltage, $V_E$, at the emitter node 224.

During a first time period 702, T1, the controller 532 may turn on the switch 234 with a high $V_{PLS\_T1}$ signal of graph 712. While the $V_{PLS\_T1}$ signal is high, current passes from the input node 202 through the BJT 220 and through the emitter node 224. As shown in graph 714, the current through the emitter node 224, $I_E$, ramps up over a portion of the time period 702. While, the $V_{PLS\_T1}$ signal of graph 712 is high, current also flows through the switch 234 and through the current detect circuit 236 as current $I_{sense}$. During the first time period 702, the current $I_{sense}$ of graph 716 is approximately equal to the current $I_E$ of graph 714. The voltage at the emitter node 224, $V_E$, is shown in graph 724, and a corresponding voltage for the collector node 222, $V_C$, is shown in graph 722. During the first time period 702, the emitter voltage, $V_E$, may be equal to a voltage, $V_{sns}$, across the sense resistor 536. While the $V_{PLS\_T1}$ signal is high, the controller 532 may hold the $V_{PLS\_T2}$ signal low to turn off the switch 542.

When the controller 532 detects the current $I_{sense}$ of graph 716 reaches a certain value, the controller 532 may turn off the switch 234. The controller 532 may turn off the switch 234 by switching the $V_{PLS\_T1}$ signal of graph 712 to low during a second time period 704, $T_1'$. During the second time period 704, current at the emitter node 224 may continue to increase as shown in graph 714. Furthermore, a reverse recovery current may be generated from the base node 226 of the BJT 220, which may pass through the reverse recovery control and detect circuit 550. Graph 718 illustrates this reverse recovery current, $I_{RR}$, during the second time period 704.

During the first two time periods 702 and 704, current passing through the inductor 212 causes the inductor 212 to store energy. The controller 532 may then determine to transfer the energy from the inductor 212 to the lighting load 214 to generate light in a light bulb. In one embodiment, the energy transfer to the lighting load begins when the BJT 220 turns off after all base charge is discharged. When the controller 532 determines to begin a third time period 706, the controller 532 switches the $V_{PLS\_T2}$ signal of graph 720 to high to turn on the switch 542. When the switch 542 is turned on, the zero current detect circuit 540 is coupled to the emitter node 224 for monitoring the energy transfer to the lighting load 214. The circuit 540 may monitor energy transfer to the lighting load 214.

In one embodiment, the circuit 540 may be configured to detect ringing to determine when energy transfer to be lighting load 214 is nearing completion or is completed. When the inductor 212 is nearly or completely discharged, a collector voltage, $V_C$, begins ringing as shown in graph 722 at time 732. Likewise, the emitter voltage, $V_E$, experiences similar ringing as shown in graph 724 at time 732, although out of phase from the collector voltage, $V_C$. With the switch 542 turned on by the high $V_{PLS\_T2}$ signal of graph 720, the zero current detect circuit 540 may detect the ringing at time 732 and provide information to the controller 532. The ringing at time 732 may occur when inductor 212 is discharged causing the voltage across diode 216 to reach zero.

The controller 532 may determine to end the third time period 706 and repeat the cycle of charging and discharging the inductor 212 through the time periods 702, 704, and 706. The controller 532 begins a new first time period 702 by switching the $V_{PLS\_T2}$ signal to low and switching the $V_{PLS\_T1}$ signal to high. In one embodiment, the controller 532 may determine a second valley of the collector voltage, $V_C$, at time 734 and switch the $V_{PLS\_T1}$ signal at time 734. The controller 532 may process information received from the zero current detect circuit 540 to determine a timing of the second valley of the collector voltage, $V_C$. For example, the controller 532 may predict the timing of the second valley of the collector voltage, $V_C$, by adding a 90 degree phase shift to the emitter voltage, $V_E$, sensed by the zero current detect circuit 540.

Figure 8:
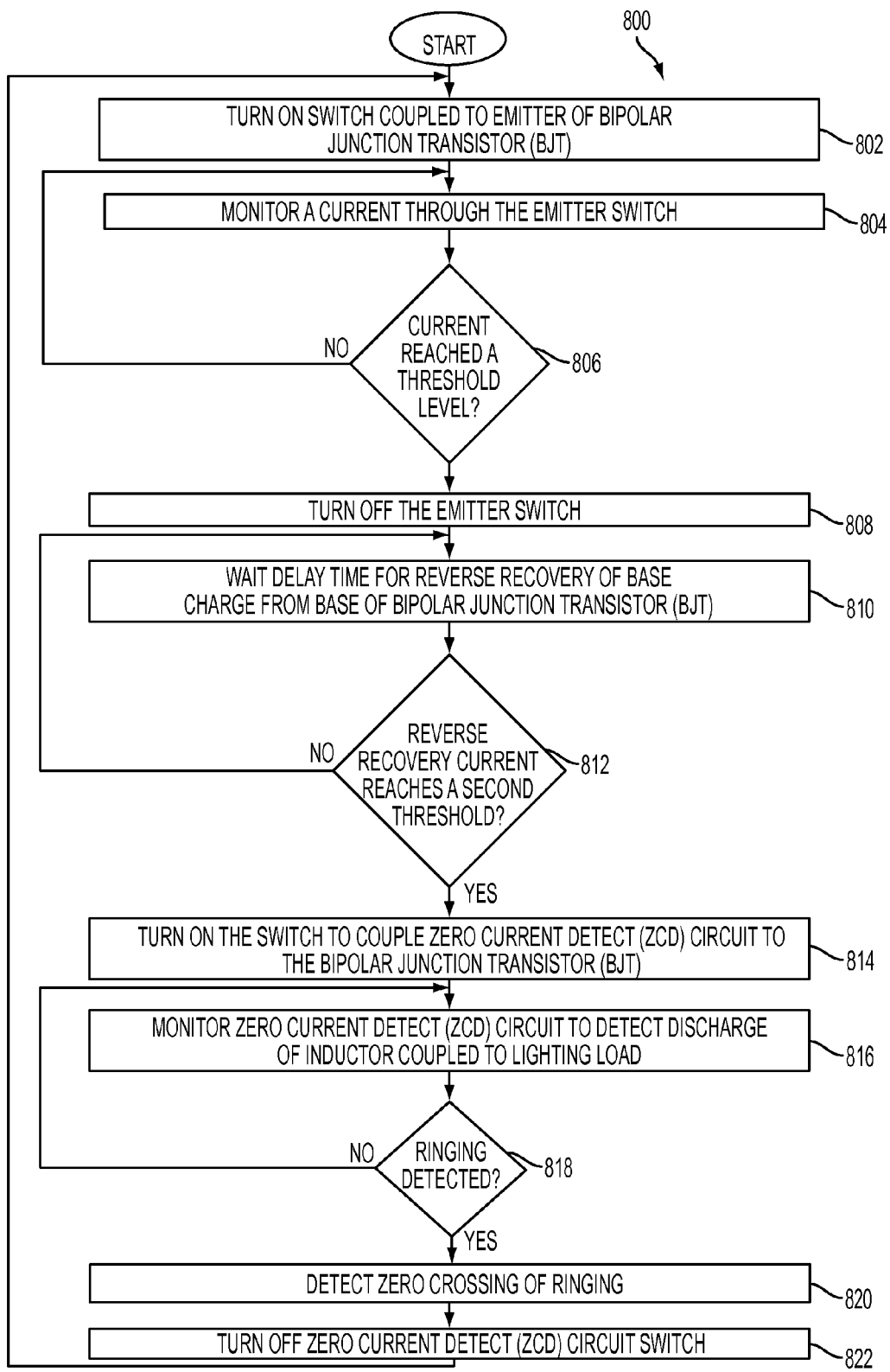
FIG. 8 is a flow chart illustrating a method for operating an emitter-controlled bipolar junction transistor (BJT) with reverse recovery control and zero current detection according to one embodiment of the disclosure.

A method executed by the controller 532 for controlling delivery of energy to a lighting load as shown in the graphs of FIG. 7 is shown in a flow chart in FIG. 8. FIG. 8 is a flow chart illustrating a method for operating an emitter-controlled bipolar junction transistor (BJT) with reverse recovery control and zero current detection according to one embodiment of the disclosure. A method 800 begins at block 802 with turning on a switch coupled to an emitter of a bipolar junction transistor (BJT). At block 804, the controller monitors a current through the emitter switch turned on in block 802. At block 806, the controller determines whether the monitored current of block 804 reaches or exceeds a threshold level. If not, current monitoring at block 804 continues. When the threshold level of block 806 is reached, the controller turns off the emitter switch at block 808.

At block 810, the controller delays for a wait time while base charge is reverse recovered from the BJT. At block 812, the controller determines if the reverse recovery current reaches a second threshold. If not, the controller continues to delay at block 810. When the threshold level of block 812 is reached, at block 814 the controller may turn on a switch to couple a zero current detect (ZCD) circuit to the emitter of the BJT.

At block 816, the controller may monitor the zero current detect (ZCD) circuit to determine when the inductor coupled to a lighting load is nearly or completely discharged. For example, at block 818 the controller may determine whether a ringing is detected at a terminal of the BJT. If not, the controller continues to monitor the zero current detect (ZCD) circuit at block 816. If ringing is detected at block 818, then the controller may detect a zero crossing of the ringing, such as a second valley of the ringing, and turn off the zero current detect (ZCD) circuit switch at the zero crossing at block 822. The method 800 may then return to block 802 to continue another cycle.

Figure 9:
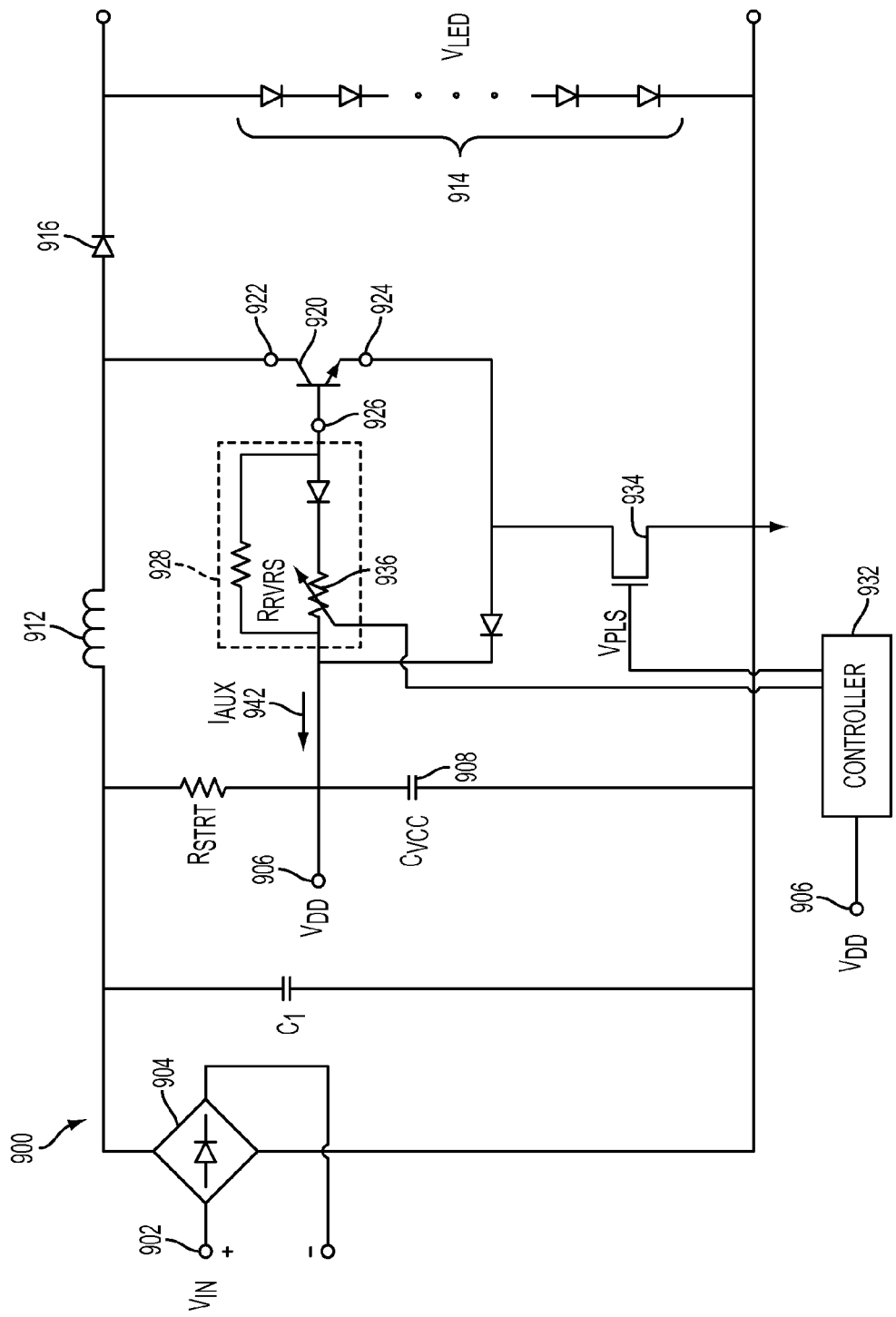
FIG. 9 is a circuit schematic illustrating an emitter-controlled bipolar junction transistor (BJT) with reverse recovery control according to one embodiment of the disclosure.

As described above in the circuits of FIG. 5 and FIG. 6, a reverse recovery time may be controlled by coupling additional diodes in series to adjust a value of the reverse recovery current. In another embodiment, a reverse recovery time may be controlled through a variable resistor coupled to a base of the bipolar junction transistor (BJT). A circuit for implementing this embodiment is shown in FIG. 9. FIG. 9 is a circuit schematic illustrating an emitter-controlled bipolar junction transistor (BJT) with reverse recovery control according to one embodiment of the disclosure. A circuit 900 includes an input node 902 for receiving a high voltage, such as a line voltage. The input voltage may pass through rectifier 904 to an inductor 912. The inductor 912 may store energy from the input voltage and discharge energy into a lighting load 914 through a diode 916 under control of a controller 932.

The controller 932 may control transfer of energy to and from the inductor 912 by operating a switch coupled to an emitter node 924 of a bipolar junction transistor (BJT) 920. The controller 932 may also control a variable resistor 936 in a base drive circuit 928 coupled to a base node 926 of the bipolar junction transistor (BJT) 920. By increasing or decreasing a resistance of the variable resistor 936, the controller may decrease or increase, respectively, a discharge current of base from the bipolar junction transistor (BJT) 920. The reverse recovery time period may be increased when the controller 932 increases the resistance. The reverse recovery time period may be decreased when the controller 932 decreases the resistance.

Figure 10:
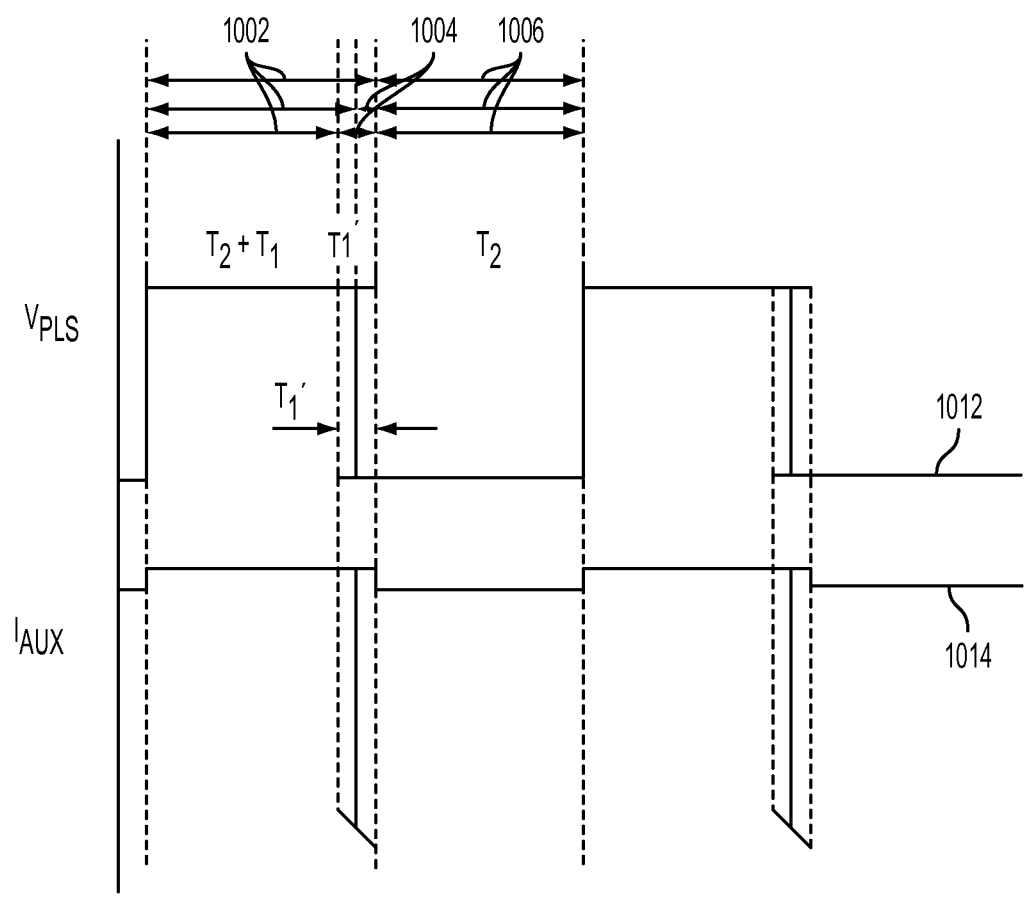
FIG. 10 are graphs illustrating timing diagrams for controlling reverse recovery of an emitter-controlled bipolar junction transistor (BJT) according to one embodiment of the disclosure.
Figure 11:
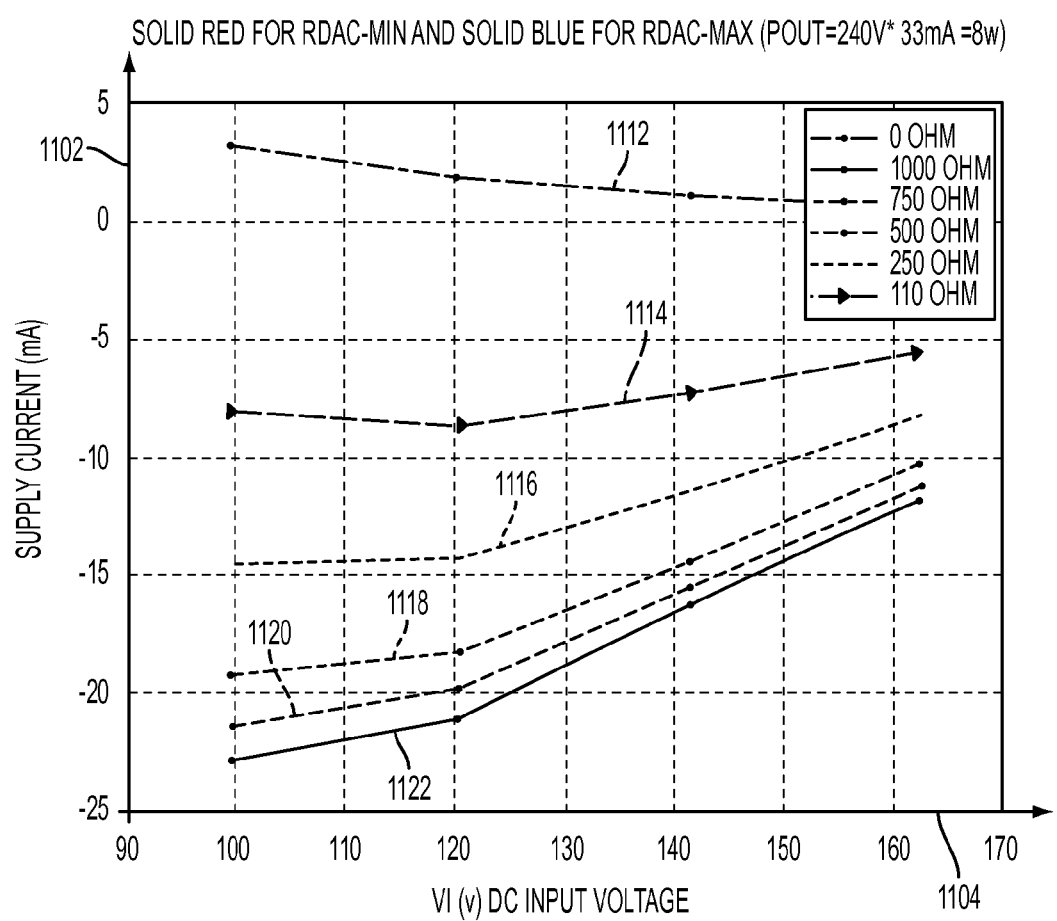
FIG. 11 is a graph illustrating different supply currents at different input voltages for different resistor values according to one embodiment of the disclosure.

The effects of changing the resistance of the variable resistor 936 are shown in FIG. 10. FIG. 10 are graphs illustrating timing diagrams for controlling reverse recovery of an emitter-controlled bipolar junction transistor (BJT) according to one embodiment of the disclosure. A graph 1012 illustrates a signal $V_{PLS}$ generated by the controller 932 for operating the switch 934. The $V_{PLS}$ signal may be high during a time period 1002, $T_1$, and switched low for a time period 1004, $T_1'$, and 1006, $T_2$. A duration of the time period 1004 may be adjusted by varying the resistance of the variable resistor 936. The $T_1+T_1'$ time may be fixed for a fixed output power to the lighting load 214. Thus, current through the inductor 912 may reach the same peak value regardless of the selected variable resistance. The variable resistance, by controlling a duration of the reverse recovery time period $T_1'$, may vary an amount of energy harvested from the base node 926 of the bipolar junction transistor (BJT) 920. The amount of energy harvested for a power supply, such as stored in capacitor 908, may increase as shown in graph 1014. Graph 1014 illustrates a current 942 to the output node 906. The energy harvested during time period $T_1'$ may be used to provide a power supply to the controller 932. For example, the reverse current may charge the capacitor 908, which is coupled to power supply node 906 and to the controller 932. The changing supply current to the power supply node 906 as a function of the resistance of the variable resistor 936 is shown in FIG. 11. FIG. 11 is a graph illustrating different supply currents at different input voltages for different resistor values for variable resistor 936 according to one embodiment of the disclosure. For example, lines 1112, 1114, 1116, 1118, 1120, and 1122 correspond to resistor values of 0, 110, 250, 500, 750, and 1000 Ohms.

Figure 12:
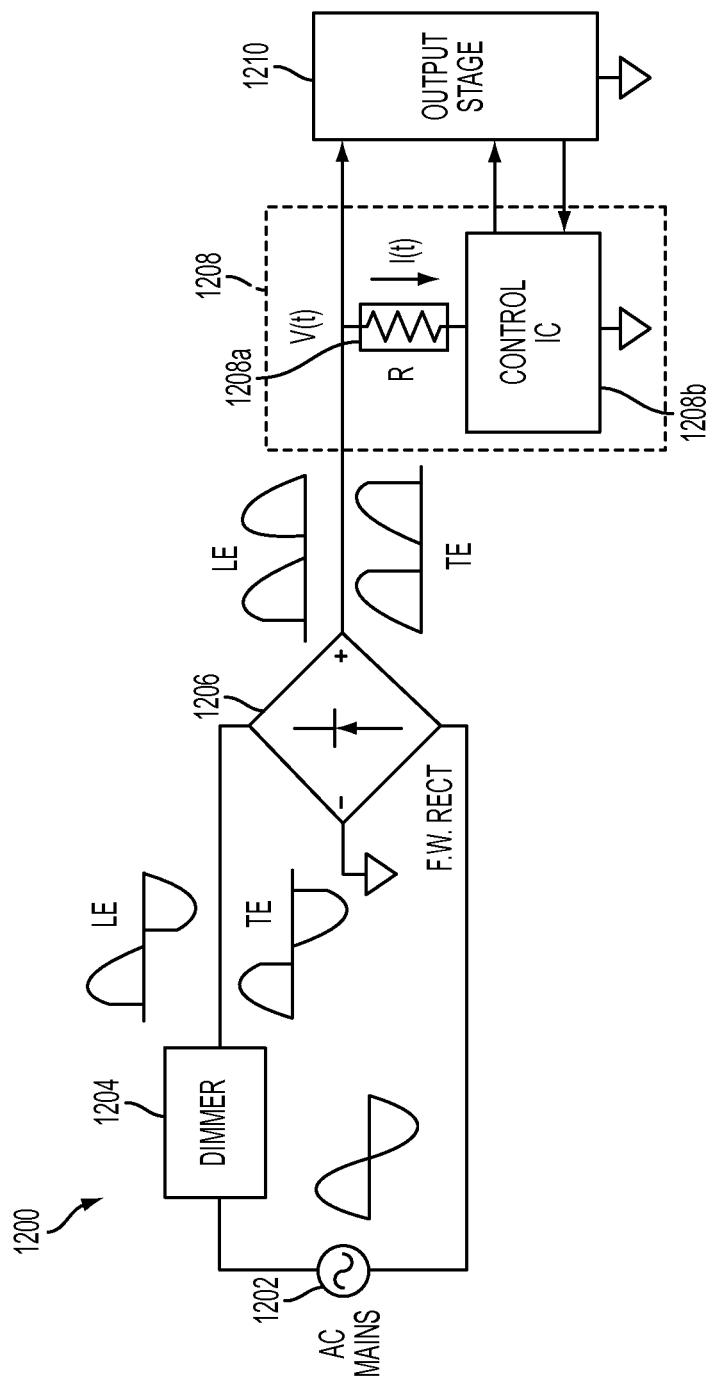
FIG. 12 is a block diagram illustrating a dimmer system for a light-emitting diode (LED)-based bulb with an emitter-controlled bipolar junction transistor (BJT)-based power stage according to one embodiment of the disclosure.

The controller and variable resistance load device described above may be integrated into a dimmer circuit to provide dimmer compatibility, such as with lighting devices. FIG. 12 is a block diagram illustrating a dimmer system for a light-emitting diode (LED)-based bulb with an emitter-controlled bipolar junction transistor (BJT)-based power stage according to one embodiment of the disclosure. A system 1200 may include a dimmer compatibility circuit 1208 with a variable resistance device 1208a and a control integrated circuit (IC) 1208b. The dimmer compatibility circuit 1208 may couple an input stage having a dimmer 1204 and a rectifier 1206 with an output stage 1210, which may include light emitting diodes (LEDs). The system 1200 may receive input from an AC mains line 1202. The output stage 1210 may include a power stage based on a bipolar junction transistor (BJT) as described above. For example, the output stage 1210 may include an emitter-switched bipolar junction transistor (BJT) in the configurations of FIG. 2, FIG. 5, or FIG. 9.

If implemented in firmware and/or software, the functions described above, such as with respect to FIG. 3, FIG. 4, and FIG. 8 may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. For example, although signals generated by a controller are described throughout as "high" or "low," the signals may be inverted such that "low" signals turn on a switch and "high" signals turn off a switch. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
   an integrated circuit (IC) configured to couple to a bipolar junction transistor (BJT) through a single pin that is configured to couple to an emitter of the bipolar junction transistor (BJT), wherein the integrated circuit (IC) comprises:
   a switch configured to couple to the emitter of the bipolar junction transistor (BJT);
   a current detector coupled to the switch and configured to detect when a current from the emitter of the bipolar junction transistor (BJT) reaches a threshold value; and
   a controller coupled to the switch and to the current detector and configured to:
      control delivery of power to a load by operating the switch;
      sense a current through the bipolar junction transistor (BJT); and
      turn off the switch when the current detector detects the threshold value is reached.

2. The apparatus of claim 1, further comprising the bipolar junction transistor (BJT) comprising a base, the emitter, and a collector, wherein the emitter is coupled to the integrated circuit (IC).

3. The apparatus of claim 2, further comprising a base drive circuit coupled to the base of the bipolar junction transistor (BJT), wherein the base drive circuit is configured to bias the base of the bipolar junction transistor (BJT) from a power supply node.

4. The apparatus of claim 3, wherein the power supply node is coupled to an external source.

5. The apparatus of claim 1, wherein the controller is configured to:
   turn on the switch to direct current to charge an inductor during a first time period, during which a base charge is accumulated at the base of the bipolar junction transistor (BJT); and
   turn off the switch to begin a reverse recovery of the base charge at the base of the bipolar junction transistor (BJT).

6. The apparatus of claim 5, wherein turning off the switch causes the bipolar junction transistor (BJT) to discharge a base charge from the base of the bipolar junction transistor (BJT) until the bipolar junction transistor (BJT) turns off, after which current from the inductor is directed to a lighting load.

7. The apparatus of claim 5, wherein the reverse recovery of the charge is used to charge a chip supply for the integrated circuit (IC) by redirecting current from the emitter of the BJT through the IC by redirecting current from the emitter of the BJT through the IC.

8. The apparatus of claim 1, wherein the current detector comprises:
   a sense resistor configured to be coupled to the emitter of the bipolar junction transistor (BJT); and
   a comparator coupled to the sense resistor and wherein the comparator is configured to couple to a threshold voltage corresponding to the threshold value, wherein the comparator is further configured to output a comparator signal based, at least in part, on a comparison of a voltage at the emitter of the bipolar junction transistor (BJT) and the threshold voltage, and
   wherein the controller is configured to turn off the switch based, at least in part, on the comparator signal.

9. The apparatus of claim 1, further comprising a reverse-recovery control circuit configured to be coupled to the emitter of the bipolar junction transistor (BJT) and configured to be coupled to a power supply node, wherein the reverse-recovery control circuit is configured to regulate a discharge current from the base of the bipolar junction transistor (BJT) to the power supply node.

10. The apparatus of claim 9, wherein the reverse-recovery control circuit comprises:

a plurality of diodes; and
a plurality of switches corresponding to the plurality of diodes, each of the plurality of switches being coupled in parallel with one of the plurality of diodes.

11. The apparatus of claim 1, further comprising:
a capacitive coupling that is configured to be coupled between the emitter and a collector of the bipolar junction transistor (BJT); and
a zero current detection block configured to be coupled to the emitter of the bipolar junction transistor (BJT) and configured to detect a ringing at the collector of the bipolar junction transistor (BJT) through the high-pass filter,
wherein the controller is coupled to the current detection block and configured to turn on the switch after the ringing is detected.

12. The apparatus of claim 11, wherein the controller is configured to:
detect a valley of the ringing; and
turn on the switch approximately at the valley of the ringing.

13. The apparatus of claim 11, wherein the capacitive coupling comprises a high-pass filter (HPF) comprising:
a capacitor configured to be coupled to the emitter and the collector of the bipolar junction transistor (BJT); and
a resistor configured to be coupled to the emitter of the bipolar junction transistor (BJT).

14. A method, comprising:
configuring an integrated circuit (IC) to control a bipolar junction transistor (BJT) through a single pin that is configured to couple the integrated circuit (IC) to the bipolar junction transistor (BJT);
controlling, by the integrated circuit (IC), delivery of power to a load by operating a switch configured to couple to an emitter of the bipolar junction transistor (BJT) through the single pin, wherein the step of operating the switch further comprises:
turning on the switch to direct current to the load during a first time period, during which a base charge is accumulated at the base of the bipolar junction transistor (BJT); and
turning off the switch to begin a reverse recovery of the base charge at the base of the bipolar junction transistor (BJT);
sensing, by the integrated circuit (IC), current through the bipolar junction transistor (BJT) through the single pin;
detecting when an emitter current from the emitter of the bipolar junction transistor (BJT) reaches a threshold value by comparing a voltage at a sense resistor coupled to the emitter of the bipolar junction transistor (BJT) with a reference voltage; and
turning off the switch after detecting the emitter current reaches the threshold value.

15. The method of claim 14, further comprising coupling the integrated circuit (IC) to the bipolar junction transistor (BJT).

16. The method of claim 15, further comprising biasing a base of the bipolar junction transistor (BJT) with an approximately fixed voltage from a power supply node.

17. The method of claim 16, wherein the step of operating the switch further comprises:
turning on the switch to direct current to the load during a first time period, during which a base charge is accumulated at the base of the bipolar junction transistor (BJT); and
turning off the switch to begin a reverse recovery of the base charge at the base of the bipolar junction transistor (BJT).

18. The method of claim 17, wherein turning off the switch causes the bipolar junction transistor (BJT) to discharge a base charge from the base of the bipolar junction transistor (BJT) until the bipolar junction transistor (BJT) turns off, after which current from the inductor is directed to a lighting load.

19. The method of claim 17, further comprising recovering current from the base charge at the base of the bipolar junction transistor (BJT) to supply a controller.

20. The method of claim 17, further comprising regulating a discharge of the base charge from the base of the bipolar junction transistor (BJT).

21. The method of claim 20, wherein the step of regulating further comprises shorting out one or more diodes.

22. An apparatus, comprising:
a lighting load comprising a plurality of light emitting diodes (LEDs);
a bipolar junction transistor (BJT) comprising a base, an emitter, and a collector, wherein the collector of the bipolar junction transistor (BJT) is coupled to an input node; and
an integrated circuit (IC) configured to couple to the bipolar junction transistor (BJT) through a single pin that is configured to couple to the emitter of the bipolar junction transistor (BJT), wherein the integrated circuit (IC) comprises:
a switch configured to couple to the emitter of the bipolar junction transistor (BJT);
a current sensor coupled to the switch and configured to detect when a current from the emitter of the bipolar junction transistor (BJT) reaches a threshold value; and
a controller coupled to the switch and configured to control delivery of power to the lighting load by operating the switch and configured to sense a current through the bipolar junction transistor (BJT), wherein the controller is configured to operate the switch based on the current sensor detecting the current reaching the threshold value.

23. The apparatus of claim 22, further comprising:
a rectifier coupled to the input node;
a dimmer coupled to the rectifier; and
a line voltage input node coupled to the dimmer.

24. The apparatus of claim 22, wherein the controller and the switch are integrated into an integrated circuit (IC), and wherein the integrated circuit (IC) controls operation of the bipolar junction transistor (BJT) through the single pin.

25. The apparatus of claim 22, further comprising a reverse recovery control circuit configured to be coupled to the base of the bipolar junction transistor (BJT), wherein the controller is configured to operate the reverse recovery control circuit to regulate a discharge of base current from the base of the bipolar junction transistor (BJT).

26. The apparatus of claim 22, further comprising a zero current detect (ZCD) circuit configured to be coupled to the emitter of the bipolar junction transistor (BJT),
wherein the zero current detect (ZCD) circuit is further configured to detect a discharge of an inductor coupled to the collector of the bipolar junction transistor (BJT).

27. The apparatus of claim 26, wherein the controller is configured to operate the switch based, at least in part, on the detection of the discharge of the inductor by the zero current detect (ZCD) circuit.

* * * * *